US008560960B2

(12) United States Patent  (10) Patent No.: US 8,560,960 B2
Goossens et al.  (45) Date of Patent: Oct. 15, 2013

(54) BROWSING AND INTERACTING WITH OPEN WINDOWS

(75) Inventors: Thomas Goossens, Paris (FR); Fabrice Robinet, Puteaux (FR)

(73) Assignee: Apple Inc., Cupertino, CA (US)

( * ) Notice: Subject to any disclaimer, the term of this patent is extended or adjusted under 35 U.S.C. 154(b) by 389 days.

(21) Appl. No.: 12/953,389

(22) Filed: Nov. 23, 2010

(65) Prior Publication Data

US 2012/0131495 A1  May 24, 2012

(51) Int. Cl.
*G06F 3/048*  (2013.01)
(52) U.S. Cl.
USPC .......................... 715/782; 715/781; 715/848
(58) Field of Classification Search
USPC ......................................... 715/782, 781, 848
See application file for complete search history.

(56) References Cited

U.S. PATENT DOCUMENTS

| | | | | |
|---|---|---|---|---|
| 5,678,015 | A * | 10/1997 | Goh | 715/782 |
| 5,754,809 | A * | 5/1998 | Gandre | 715/782 |
| 5,880,733 | A * | 3/1999 | Horvitz et al. | 715/850 |
| 6,229,542 | B1 * | 5/2001 | Miller | 715/782 |
| 6,313,855 | B1 * | 11/2001 | Shuping et al. | 715/854 |
| 6,459,435 | B1 * | 10/2002 | Eichel | 345/588 |
| 6,466,239 | B2 * | 10/2002 | Ishikawa | 715/850 |
| 6,577,304 | B1 * | 6/2003 | Yablonski et al. | 345/419 |
| 6,922,815 | B2 * | 7/2005 | Rosen | 715/782 |
| 7,119,819 | B1 * | 10/2006 | Robertson et al. | 715/782 |
| 7,581,186 | B2 | 8/2009 | Dowdy et al. | |
| 2001/0015719 | A1 | 8/2001 | Van Ee et al. | |
| 2004/0109031 | A1 * | 6/2004 | Deaton et al. | 345/848 |
| 2004/0150657 | A1 * | 8/2004 | Wittenburg et al. | 345/619 |
| 2005/0091596 | A1 | 4/2005 | Anthony et al. | |
| 2006/0161861 | A1 * | 7/2006 | Holecek et al. | 715/782 |
| 2007/0240079 | A1 | 10/2007 | Flynt et al. | |
| 2008/0062141 | A1 | 3/2008 | Chandhri | |
| 2008/0307363 | A1 | 12/2008 | Jalon et al. | |
| 2009/0125801 | A1 * | 5/2009 | Algreatly | 715/234 |
| 2010/0011314 | A1 | 1/2010 | Peterson | |
| 2010/0175026 | A1 | 7/2010 | Bortner et al. | |

FOREIGN PATENT DOCUMENTS

GB  2461757  1/2010

OTHER PUBLICATIONS

International Search Report and Written Opinion of the International Searching Authority issued in International Application No. PCT/US2011/061721, Jun. 14, 2012, 14 pages.
OasisGames: "Compiz-Fusion Shift Switcher plugin," [online], May 18, 2008, XP002670794, retrieved from the Internet on Feb. 17, 2012, 3 pages, URL: <http://commons/wikimedia.org/wiki/File:Cf-shift-switcher.png>.

(Continued)

*Primary Examiner* — Phenuel Salomon
(74) *Attorney, Agent, or Firm* — Fish & Richardson P.C.

(57) ABSTRACT

Methods, systems, and computer-readable media for managing open windows in a desktop GUI are disclosed. In various implementations, within a three-dimensional desktop, the open windows can be displayed in a three-dimensional browsable parade. As the user browses through the open windows in the browsable parade, the open window passing through a designated primary location of the three-dimensional desktop becomes the current active window of the desktop. An application menu bar of the current active window can be displayed on the three-dimensional desktop. The application menu bar and the active window together provide the full range of interactive capabilities that the native application environment of the open window would allow, even though the open window is currently displayed within the browsable parade.

21 Claims, 13 Drawing Sheets

(56) References Cited

OTHER PUBLICATIONS

Anonymous, "File: Panther expose.jpg," Wikipedia, [online], Jul. 18, 2010, XP002670795, retrieved from the Internet on Feb. 17, 2013, 2 pages, URL: <http://en.wikipedia.org/wiki/file:panther_expose.jpg>.

"Cover Flow", Wikipedia [online], [retrieved on Aug. 5, 2010]. Retrieved from the Internet: <URL: http://en.wikipedia.org/wiki/Cover_Flow>, 5 pages.

"Exposé (MAC OS X)", Wikipedia [online], [retrieved on Aug. 5, 2010]. Retrieved from the Internet: <URL: http://en.wikipedia.org/wiki/Expos%C3%A9_(Mac_OS_X)>, 7 pages.

"Fsn (File System Navigator)", Wikipedia [online], [retrieved on Aug. 5, 2010]. Retrieved from the Internet: <URL: http://en.wikipedia.org/wiki/Fsn>, 2 pages.

"FSN—the IRIX 3D file system tool from Jurassic Park", SiliconBunny [online], [retrieved on Aug. 5, 2010]. Retrieved from the Internet: <URL: http://www.siliconbunny.com/fsn-the-irix-3d-file-system-tool-from-jurassic-park>, 5 pages.

"Fsv—3D File System Visualizer", fsv.sourceforge.net [online], [retrieved on Aug. 5, 2010]. Retrieved from the Internet: <URL: http://fsv.sourceforge.net/>, 3 pages.

"MonkeyFlow 1.2.1 [MM3]", MediaMonkey [online], [retrieved on Aug. 5, 2010]. Retrieved from the Internet: <URL: http://www.mediamonkey.com/forum/viewtopic.php?t=31402>, 16 pgs.

Shilovitsky, O., "3 Ways to Visualize Hierarchical Structures", Sep. 10, 2009, 3D Perspectives [online], [retrieved on Aug. 5, 2010]. Retrieved from the Internet: <URL: http://perspectives.3ds.com/2009/09/10/3-ways-to-visualize-hierarchical-structures/>, 9 pages.

"Time Machine (Apple Software)", Wikipedia [online], [retrieved on Aug. 5, 2010]. Retrieved from the Internet: <URL: http://en.wikipedia.org/wiki/Time_Machine_(Apple_software)>, 7 pages.

Willis, N., "Picture your disk space with 3-D filesystem browsers", Linux [online], [retrieved Aug. 5, 2010]. Retrieved from the Internet: <URL: http://www.linux.com/archive/articles/57717>, 8 pages.

\* cited by examiner

800

Causing a plurality of windows to be presented in a parade, each window being provided by a respective application, the parade operable to advance along a pre-determined path in a series of locations across a three-dimensional (3D) desktop under a user's direction, the series of locations including a primary location and one or more secondary locations proximate the primary location along the predetermined path, and each open window being presented in an enlarged frontal view when occupying the primary location and in a diminished oblique view when occupying one of the secondary locations
802

Presenting a first application-level menu bar at a designated menu location on the 3D desktop, the first application-level menu bar permits user interaction with a first application corresponding to a first open window currently occupying the primary location
804

Detecting an input causing a transition of occupancy at the primary location from the first open window to a second open window, where the first open window and the second open window correspond to two different applications
806

In response to the detecting, causing a second application-level menu bar to be presented at the designated menu location, the second application-level menu bar permits user interaction with a second application corresponding to the second open window
808

FIG. 8

BROWSING AND INTERACTING WITH OPEN WINDOWS

TECHNICAL FIELD

This disclosure relates generally to providing information on computers and other devices.

BACKGROUND

A modern computing device, such as a personal computer, a smart phone, a game device, a handheld computer, a GPS device, and so on, includes a software operating system that allows the computer device to be controlled either directly by the user or by one or more application programs executing within the operating system.

Many operating systems and software applications employ graphical user interfaces (GUIs) to present information to users and to receive user input for controlling the behavior and functionalities of the underlying computing devices and/or application programs. A typical two-dimensional GUI of an operating system can be described as a "desktop" metaphor. Many software applications executing in the operating system can provide graphical objects, so-called "windows," to present information content and various input control elements. Visually, a two-dimensional desktop of an operating system provides a background plane on which application windows provided by active software applications can be displayed.

Operating systems of the computing devices can often support multiple active applications at the same time, and each of the active applications can have multiple open windows concurrently presented on the desktop. Various schemes for managing the presentation and layout of open windows on the desktop have been proposed to improve the organization and navigation of the open windows.

SUMMARY

This disclosure relates generally to presentation and management of Desktop GUIs and opening windows on the desktop GUIs.

In general, one innovative aspect of the subject matter described in this specification can be embodied in methods that include the actions of: causing a plurality of windows to be presented along a path in a user interface presented on a display of the device, the windows operable to advance along the predetermined path in a series of locations, the series of locations including a primary location and one or more secondary locations; causing a first application-level menu bar to be presented to permit user interaction with a first application corresponding to a first window that occupies the primary location; detecting an input for instructing a transition of occupancy at the primary location from the first window to a second window; and in response to the detecting, causing a second application-level menu bar to be presented to permit user interaction with a second application corresponding to the second window Other embodiments of this aspect include corresponding systems, apparatus, and computer programs, configured to perform the actions of the methods, encoded on computer storage devices.

These and other embodiments can each optionally include one or more of the following features.

In some implementations, the input instructing the transition of occupancy at the primary location is an input for advancing the windows along the path in a user-specified direction.

In some implementations, the input instructing the transition of occupancy at the primary location is an input selecting the second window while the second window occupies one of the secondary locations.

In some implementations, the plurality of windows are grouped into two or more application groups, each application group including open windows provided by a common application, and the windows in each application group are operable to advance along the path as a unit.

In some implementations, the method further includes the actions of: detecting a second input browsing a first application group occupying the primary location; and in response to the second input, causing the windows in the first application group to cycle through a first position at the primary location, wherein an window occupying the first position becomes an active window.

In some implementations, the plurality of windows are presented in a three-dimensional (3D) space, and the method further includes the actions of: detecting a second input for raising a viewing angle of the 3D space; and in response to the second input, causing the plurality of windows to be viewed from the raised viewing angle.

In general, one innovative aspect of the subject matter described in this specification can be embodied in methods that include the actions of: causing a plurality of windows to be presented in a parade, each window being provided by a respective application, the parade operable to advance along a pre-determined path in a series of locations across a three-dimensional (3D) desktop under a user's direction, the series of locations including a primary location and one or more secondary locations proximate the primary location along the predetermined path, and each open window being presented in an enlarged frontal view when occupying the primary location and in a diminished oblique view when occupying one of the secondary locations; presenting a first application-level menu bar at a designated menu location on the 3D desktop, the first application-level menu bar permits user interaction with a first application corresponding to a first open window currently occupying the primary location; detecting an input causing a transition of occupancy at the primary location from the first open window to a second open window, where the first open window and the second open window correspond to two different applications; and in response to the detecting, causing a second application-level menu bar to be presented at the designated menu location, the second application-level menu bar permits user interaction with a second application corresponding to the second open window.

Other embodiments of this aspect include corresponding systems, apparatus, and computer programs, configured to perform the actions of the methods, encoded on computer storage devices.

In general, one innovative aspect of the subject matter described in this specification can be embodied in methods that include the actions of: presenting a plurality of open windows in a three-dimensional browsable parade, each open window being provided by a respective application, the browsable parade operable to advance through a series of locations across a three-dimensional desktop under a user's direction, the series of locations including a primary location and one or more secondary locations preceding and succeeding the primary location on the three-dimensional desktop, and each open window being presented in an enlarged frontal view when occupying the primary location and in a diminished oblique view when occupying one of the secondary locations; presenting a first menu bar at a designated menu location on the three-dimensional desktop, the first menu bar being an application-level menu bar of the respective application providing a first open window currently occupying the primary location on the three-dimensional desktop; detecting an input causing a transition at the primary location from the first open window to a second open window, where the first open window and the second open window are provided by two different applications; and in response to the detecting, replacing the first menu bar at the designated menu location using an application-level menu bar of the respective application of the second open window.

Other embodiments of this aspect include corresponding systems, apparatus, and computer programs, configured to perform the actions of the methods, encoded on computer storage devices.

These and other embodiments can each optionally include one or more of the following features.

In some implementations, the methods further include the actions of receiving user input browsing through the three-dimensional browsable parade in a first direction; and in response to the received user input, advancing the plurality of open windows through the series of locations in the first direction, wherein the advancing includes the actions of: replacing a first window occupying the primary location using a second window occupying an immediately preceding secondary location of the primary location in the first direction; replacing a third window occupying an immediately preceding secondary location of the primary location using the first window that was replaced from the primary location; and rendering the second window in the enlarged frontal view and the first window in the diminished oblique view.

In some implementations, the methods further include the actions of: receiving user input selecting one of the open windows currently occupying one of the secondary locations; replacing a current occupying window at the primary location using the selected open window; and rendering the selected open window in the primary location in the enlarged frontal view.

In some implementations, the methods further include the actions of: receiving first user input for switching from the three-dimensional desktop environment to a two-dimensional desktop environment; in response to the first user input, transforming the three-dimensional desktop environment into a two-dimensional desktop environment and presenting the plurality of open windows as two-dimensional graphical objects on a two-dimensional desktop plane; receiving second user input for switching from the two-dimensional desktop environment to the three-dimensional desktop environment; and in response to the second user input, transforming the two-dimensional desktop environment to the three-dimensional environment and presenting the plurality of open windows in the three-dimensional browsable parade.

In some implementations, presenting the plurality of open windows in the three-dimensional browsable parade, further includes the actions of: grouping the plurality of open windows into one or more application groups, each application group including one or more of the plurality of open windows provided by a common application; and presenting the one or more application groups in the browsable parade, wherein the open windows in each application group advances through the series of locations across the three-dimensional desktop as a unit.

In some implementations, the methods further include the actions of: receiving first user input for browsing a first application group presented at the primary location; and in response to the first user input, cycling through the one or more open windows in the application group at the primary location, and presenting one of the one or more windows in the application group in the enlarged frontal view at a time.

In some implementations, the methods further include the actions of: receiving second user input for tilting the three-dimensional desktop; and presenting the three-dimensional desktop with a raised view level, such that desktop items behind the browsable parade are revealed.

In some implementations, the methods further include actions of: presenting the browsable parade and replacing the application menu bar are performed by a window manager communicating with the respective applications of the open windows, and the current occupying window at the primary location in conjunction with the first menu bar provides a native operating environment at the primary location for interacting with the current occupying window at the primary location.

In general, one innovative aspect of the subject matter described in this specification can be embodied in methods that include the actions of: presenting a plurality of open windows in a two-dimensional desktop environment, each open window being provided by a respective application executing in the two-dimensional desktop environment; receiving user input for browsing the plurality of open windows; in response to the received user input, transforming the two-dimensional desktop environment into a three-dimensional desktop environment and presenting the plurality of open windows in a three-dimensional browsable parade, the three-dimensional browsable parade operable to advance through a series of locations across a three-dimensional desktop under a user's direction, the series of locations including a designated primary location and one or more secondary locations preceding and succeeding the designated primary location, and each open window being presented in an enlarged frontal view when occupying the designated primary location and in a diminished oblique view when occupying one of the secondary locations; and presenting a menu bar at a designated menu location on the three-dimensional desktop, the menu bar being an application-level menu bar of the respective application providing the open window currently occupying the designated primary location on the three-dimensional desktop.

Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages.

When switching between a two-dimensional (2D) desktop and a three-dimensional (3D) desktop, representations of each open window shown in the two desktops are interpolated to create a smooth transition between the two desktops. The smooth transition can help the user to maintain cognitive continuity when interacting with the open windows within the two desktops.

Within the three-dimensional desktop, the open windows can be displayed in a three-dimensional browsable parade. As the user browses through the open windows in the browsable parade, the open window passing through a primary location of the three-dimensional desktop becomes the current active window of the desktop. An application menu bar of the current active window (e.g., native application menu bar) can be displayed on the three-dimensional desktop. The application menu bar and the active window together provide the full range of interactive capabilities that the native application environment of the open window would allow, even though the open window is currently displayed within the browsable parade.

As the user browses through the three-dimensional browsable parade, the application menu bar displayed on the three-dimensional desktop is continually updated to show the application menu bar of the open window that is currently occupying the primary location of the desktop. The user can stop the browsing at any time, and immediately start interacting with the open window displayed in the primary location of the three-dimensional desktop without exiting the three-dimensional browsable parade view. The user can also resume to browsing at any time or switch to another window easily without switching to a different user interface.

By enabling the full-range of interactive capabilities of an application environment of an open window within the three-dimensional browsable parade view, the user can enjoy the benefit of both the quick and easy browsing capability of the three-dimensional browsable parade, and the full range of interaction that is conventionally only available for an active window in a two-dimensional desktop environment. This feature also allows efficient use of desktop space when used in conjunction with a wide-screen display or multiple joined displays.

In some implementations, the open windows in the desktop can be grouped according to their applications, and each application group can advance through the primary location in the three-dimensional as a unit. Browsing within each application group can be enabled when the application group enters the primary location of the desktop. Grouping by applications and browsing within the application group allows the user to quickly locate the desired open window, especially when there are a large number of open windows for one or more of the active applications.

In some implementations, the three-dimensional desktop can be tilted such that desktop items situated behind the three-dimensional browsable parade can be revealed. Allowing the tilting of the three-dimensional desktop enables more viewable space for presenting information and useful user interface elements. Tilting also allows more areas of the open windows in an application group to be revealed, and helps the user better identify the window of interest.

The details of one or more implementations of the methods, systems, and computer-readable media are set forth in the accompanying drawings and the description below. Other features, aspects, and advantages of the subject matter will become apparent from the description, the drawings, and the claims.

BRIEF DESCRIPTION OF THE DRAWINGS

FIG. 8 is a flow diagram of another exemplary process for browsing the open windows along a predetermined path.

Like reference symbols in the various drawings indicate like elements.

DETAILED DESCRIPTION

Overview

Figure 1A:
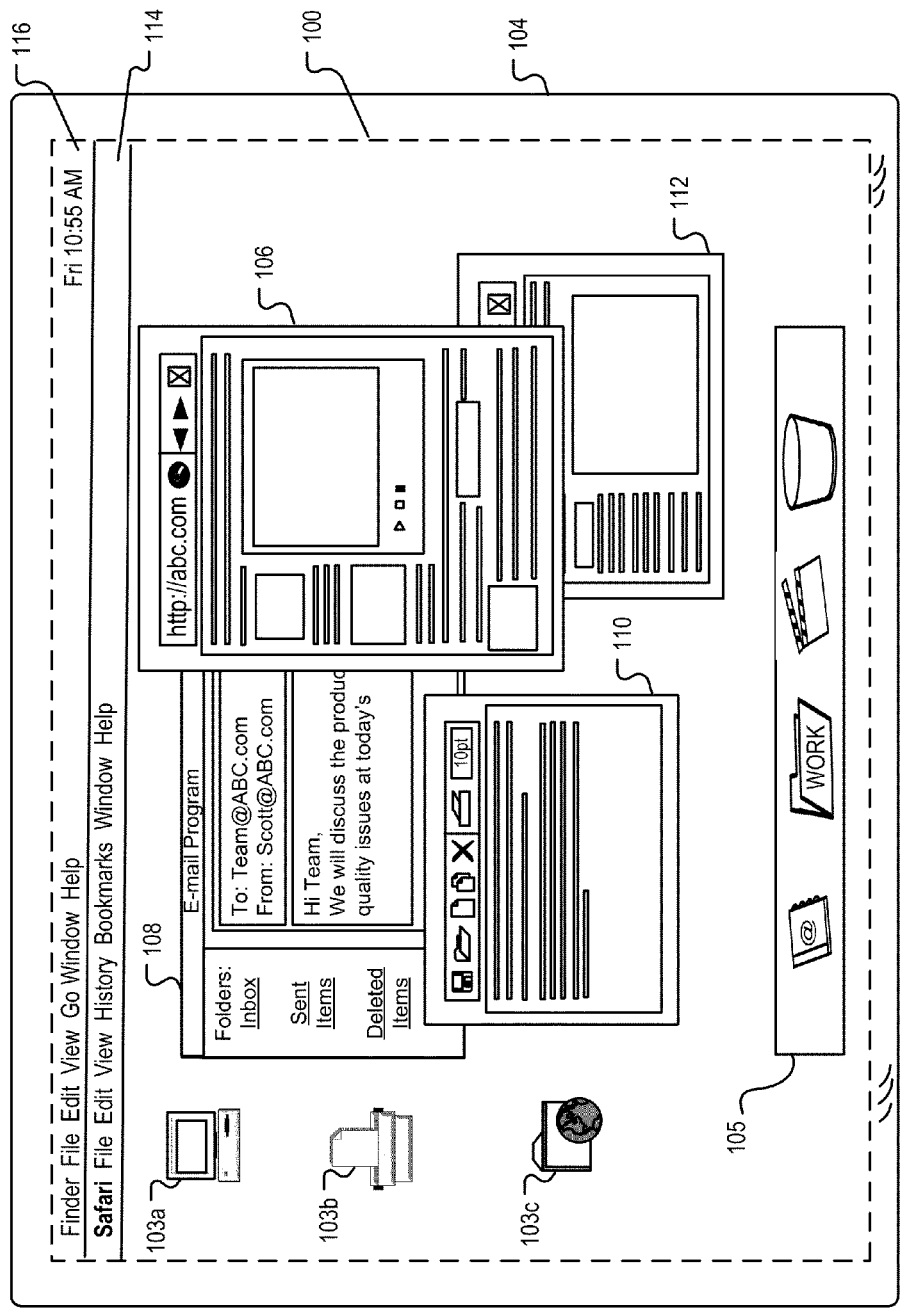
FIG. 1A illustrates an exemplary two-dimensional desktop containing multiple open windows.

Computing systems, such as personal computers, handheld devices, smart phones, gaming devices, portable computers, and so on, typically include hardware components such as a processing unit (e.g., one or more processors), memory, and various input and output devices (e.g., a display, a keyboard, a mouse, a touch-sensitive surface). An software operating system (O/S) can be installed on the computing system and executed by the processing unit to control the operations of the computing system.

Many operating systems and software applications employ graphical user interfaces (GUIs) to present information to users and to receive user input for controlling the behavior and functionality of the underlying computing devices and/or application programs. A typical two-dimensional GUI of an operating system can be described as a "desktop" metaphor.

Visually, a two-dimensional desktop of an operating system can provide a background (e.g., a desktop plane) on which other graphical objects, such as icons representing connected peripheral devices (e.g., disk drives, network devices, printers, etc.), installed programs, stored documents, open windows of executing application programs, file system folders, and so on, can be presented. In addition, user interface elements that allow user interaction with some aspects of the operating system can be presented at various locations on the desktop as well. For example, a three-dimensional menu bar showing basic controls of the desktop environment, a system tray showing programs executing in the background, a docking station for shortcuts to frequently used application programs, and so on, can also be presented on the desktop plane.

An operating system of a computing device can often support a large number of active applications at the same time, and each of the active applications can have multiple open windows concurrently presented on the desktop plane. The user can switch among the active applications and the open windows by selecting (e.g., clicking on) the window he/she wishes to access. Upon user selection, the selected open window can obtain input focus and becomes the current active window (or "top window") of the desktop. The user can interact with the current active window in a manner dictated by the application program providing the active window.

In a two-dimensional desktop environment, the visible area for presenting graphical objects, such as icons, user interface elements, and open application windows, are constrained by the size of the display screen. Even though widescreen displays and software applications for extending the operating system's desktop across multiple displays have become available, navigation among a multitude of open windows and desktop icons can still be a challenging task, especially when the windows and other graphical objects overlap and obscure one another from plain view of the desktop plane.

Some three-dimensional desktop environments have been proposed in which more space is made available for spatially organizing of user interface elements and graphical objects in the three-dimensional desktop environments. However, with the increased availability of space and complexity in manipulating graphical objects in a three-dimensional space, these three-dimensional desktop environments are often too complex and difficult to navigate as well.

As described herein, the GUI of an operating system can easily switch between a two-dimensional desktop environment and a three-dimensional desktop environment based on user election. In the two-dimensional desktop environment, when the user wishes to see all windows currently open in the desktop environment, the user can enter a particular input command to cause the desktop to enter an exposé mode. In the exposé mode, the open windows can be scaled down and tiled onto the available desktop space in the two-dimensional desktop environment.

Alternative to the two-dimensional exposé mode, the user can also choose to enter a three-dimensional cover-flow mode. In the three-dimensional cover-flow mode, the two-dimensional desktop plane is transformed into a three-dimensional desktop space. The two-dimensional graphical objects representing the open windows are organized into a three-dimensional browsable parade in the three-dimensional desktop space.

In the three-dimensional cover-flow mode, the browsable parade of open windows advances through a designated primary location (e.g., a central region) of the three-dimensional desktop under the direction of the user, and each open window entering the designated primary location becomes the current active window of the desktop. The non-active windows in the browsable parade are presented in one or more secondary locations placed on either side of the designated primary location.

In some implementations, when an open window in the three-dimensional browsable parade enters the designated primary location of the three-dimensional desktop (e.g., through by user browsing or by user selection), an application menu bar of the application providing the open window can be displayed at a designated location (e.g., under the root desktop menu bar) in the three-dimensional desktop space. The application menu bar and the active window displayed at the primary location of the three-dimensional desktop together can provide the full range of interaction capabilities available within an application environment of the active window, even though all open windows of the desktop are still displayed in the three-dimensional browsable parade.

The three-dimensional cover-flow view of the open windows as described herein offers efficient use of display space to organize and present a large number of open windows. The three-dimensional cover-flow view also allows the user to easily and quickly browse through the open windows, stop browsing at any time, and start working with the active window displayed in the primary location of the three-dimensional desktop without exiting the three-dimensional cover-flow mode. The user can also stop working with the current active window and resume to browsing at any time without switching to a different display mode.

The cover-flow view of the open windows can be implemented at the window manager level of the operating system, rather than at the individual application level. A window manager communicating with the applications of the open window can be used to determine the layout and rendering of the three-dimensional desktop and the browsable parade of open windows. No special modifications to the application programs are necessary to implement the three-dimensional browsable parade and application-level menu bar displayed in the three-dimensional desktop.

Exemplary User Interfaces for Presenting and Managing Open Windows

FIG. 1A illustrates an exemplary two-dimensional desktop 100 presenting multiple open application windows.

In some implementations, the two-dimensional desktop 100 is depicted as a two-dimensional background plane 102 on which graphical objects can be presented. For example, on the desktop plane 102, a number of icons (e.g., icons 103*a-c*) representing peripheral devices and file system folders, and a docking station for installed application programs (e.g., a dashboard 105) can be presented. The two-dimensional desktop plane 102 has the appearance of being substantially co-planer or parallel to the display surface of an underlying hardware screen 104. When an application executing in the operating system environment generates a new window, the window can be displayed on top of the two-dimensional desktop plane 102.

The open window of an application can be depicted as a two-dimensional object that can be moved laterally on the desktop plane 102. However, any movement in the direction normal to the desktop plane 102 is not enabled. In some implementations, the notion of depth in the direction normal to the desktop plane can only be reflected to a very limited degree from the appearance of overlap and relative obscuration between the open windows that are placed over the same area in the desktop plane 102.

In some implementations, the open windows can be rendered in a way to show a small thickness (e.g., by using shadowing or texture variations near the edges of the windows), and the open windows may demonstrate their relative display priorities in a virtual display stack when the open windows are rendered onto the desktop plane 102. However, the spatial arrangement of the entire desktop environment is nonetheless substantially two-dimensional due to the limitation in moving any portion of the open windows in a direction normal to desktop plane 102.

As shown in FIG. 1A, a number of open windows (e.g., windows 106, 108, 110, 112) provided by several different software applications are shown on the two-dimensional desktop plane 102. The open windows displayed on the desktop 102 are placed at various locations and can be moved by the user (e.g., by selecting and dragging the window using a pointing device). Some of the windows may also be resized (e.g., by clicking and dragging a corner of the window using a pointing device), such that the open windows can adopt different lateral dimensions.

When the user selects an open window displayed on the desktop plane 102, the selected open window can obtain input focus, and become the current active window (in other words, the "top window") of the desktop environment. The user may begin interacting with the current active window using the user interface elements provided by the application of the current active window.

For example, the current active window of the two-dimensional desktop 100 is the window 106 of a web browser application. The window 106 can contain text and other content items (e.g., images, plug-ins, interactive forms, links, etc.) embedded in a webpage. The window 106 can also include various user interface elements provided by the web browser application associated with the window 106, such as an address input field, various web navigation controls, user setting controls, and various basic controls for manipulating the window graphical object (e.g., closing, minimizing, resizing, etc.). The user can interact with the web browser application through the user interface elements provided in the window 106.

In some implementations, when an open window receives input focus and becomes the top window of the desktop, the application providing the open window can also provide an application menu bar to accompany the open window. In some implementations, the application menu bar can be presented as part of the open window. Alternatively, the application menu bar can be provided and displayed at a designated location on the desktop plane 102 apart from the open window. The application menu bar can provide a more comprehensive set of commands and options in various cascading menus that are displayed when the user selects an item listed in the application menu bar.

For example, the application menu bar 114 currently displayed on the desktop plane 102 is provided by the application (e.g., the web browser application) of the current active window (e.g., the open window 106). The application menu bar 111 can be displayed under a root desktop menu bar 116 (e.g., a menu bar for controlling desktop-level or operating-system-level properties) at the top of the desktop plane 102, for example. In some implementations, other designated locations on the desktop plane 102 can be used to present the application menu bar, as well.

Displaying the application menu bar associated with a current active window at a designated location on the desktop plane 102 regardless of the current location and size of the current active window can provide consistency in the desktop environment. In addition, the user can freely arrange the open windows on the desktop plane to a desired configuration, and switch between the open windows, without spending a mental energy to keep track of the location of the different application menu bars. Furthermore, sometimes, an application window can be resized. By placing the application menu bar at a designated location apart from the application window, the size of the application menu bar no longer needs to be limited by the size of the window, and the size of the application menu bar does not need to compete and interfere with content placement within the window.

In some implementations, the application menu bar includes options and/or commands that cause additional windows to be opened on the desktop plane 102. In some implementations, an open window itself can include elements that cause new application windows to be generated when invoked. In some implementations, if a new window is opened, the newly opened application window can obtain input focus and become the top window of the desktop.

For example, when a user clicks on a link in the webpage displayed in the open window 106, a new window can be generated by the web browser application and presented on the desktop plane 102. The new window can become the top window of the desktop. For another example, the user may also select a menu item in the application menu bar 114 provided by the web browser application to open a new window on the desktop plane 102. The user can enter a web address in the address input field of the new window, and retrieve and display another webpage in the new window.

As in the above two examples, if the new active window is provided by the same application as the application providing the previous active window, the application menu bar presented at the designated menu location on the desktop plane 102 does not need to be altered. However, if the user opens a new application window (e.g., by launching a new application, opening a new file system folder, invokes a new desktop control interface, etc.) and the new application window is provided by a different application from the application providing the previous active window, then the application menu bar 114 displayed on the desktop plane 102 can be changed to the application menu bar of the new active window.

Alternatively, if the user does not open a new window, but selects an existing open window of another application on the desktop plane 102, the selected open window can become the current active window of the desktop. The application menu bar 114 can be updated to show the application menu bar provided by the application of the selected open window.

For example, suppose the user selects an open window 110 of a word processing application shown on the desktop plane 102. Upon user selection, the open window 110 can receive input focus and become the current active window of the desktop. The window 110 can be brought to the foreground of the desktop plane 102, and the previous active window 106 loses input focus, and recedes to the background of the desktop plane 102. In some implementations, visual effects showing the transition into the foreground and/or the background can be implemented (e.g., by animation or changes in color and shades of the windows as the windows go in and out of the foreground).

In some implementations, the application menu bar 114 displayed at the designated location of the desktop plane 102 can indicate the title or logo of the application that is providing the current active window. By indicating the title or logo of the application providing the current active application, the user can be provided with an additional visual cue for identifying the application program providing the current active window. This visual cue can help users distinguish applications that have similar top-level menu items and layouts. This visual cue also helps to indicate the changes in the application menu bar.

In some implementations, depending on when an open window is last accessed (e.g., selected or opened), a relative display priority can be associated with each open window in a desktop environment to form a virtual display stack. The display stack can be used to determine how to render the open windows in the desktop environment, such that the appearance of overlapping windows can reflect the order by which the open windows have been accessed previously.

For example, the open window that is most recently accessed can be assigned the top display priority among all open windows in the desktop and not obscured by any other open window that happen to be located over the same area of the desktop plane 102. As shown in FIG. 1A, the open window 106 has the highest display priority among all the open windows displayed in the desktop plane 102. The open window 108 has a lower display priority than the open window 106. Since the window 106 and the window 108 cover a common area in the desktop plane 102, the window 106 partially covers the window 108 over the common area.

If the user selects the open window 108 (e.g., by clicking on the area of the window 108 that is visible on the desktop plane 102), the display priority of the window 108 can be updated and the window 108 moved to the top of the display stack. The relative display priority between the window 106 and other windows can remain the same. The window 108 would now partially cover the window 106 over the common area.

As shown in FIG. 1A, multiple windows provided by multiple applications are displayed. As the user continues to launch new applications, open new windows from existing active applications, or select, move, and/or resize existing windows over a period of time, the desktop 102 can become cluttered with windows, and it can become difficult to locate a desired application window quickly. In addition, sometimes, a window can become completely obscured by other windows, making it difficult and time-consuming to locate.

In some implementations, the user can issue an input command that causes the two-dimensional desktop to enter an exposé mode. In the exposé mode, all the open windows on the desktop can be scaled down and tiled onto the desktop plane 102, such that all open windows are simultaneously visible on the desktop plane 102. The scaled version of each open window can be a thumbnail image of the open window. The user can view the thumbnail images and determine which of the open windows that each thumbnail image represents. When the user selects a thumbnail image, the desktop can exit the exposé mode, and the open window represented by the selected thumbnail image can become the current active window of the desktop. The application menu bar 114 can be updated to show the application menu bar of the current active window.

In some implementations, alternative to the two-dimensional exposé mode, the user can issue another input command (e.g., a particular keyboard combination, a particular touch-based gesture, selection of a designated desktop icon, etc.) to enter a three-dimensional cover-flow mode. In the three-dimensional cover-flow mode, the open windows are presented in a three-dimensional browsable parade displayed in a three-dimensional desktop space. The open windows in the browsable parade can advance through a series of locations across the three-dimensional desktop under the user's direction.

In some implementations, the series of locations on the three-dimensional desktop can include a designated primary location, preferably in a central area of the three-dimensional desktop space. The designated primary location can be preceded by one or more secondary locations on one side (e.g., left of the designated primary location), and succeeded by one or more secondary locations on the other side (e.g., right of the designated primary location) The user can enter a browsing input (e.g., using an arrow key on the keyboard, or using a directional gesture on a touch-sensitive surface, etc.) indicating a desired direction in which the browsable parade should progress through the series of locations on the three-dimensional desktop.

As the open windows in the browsable parade advance through the series of locations one by one under the user's direction, each open window entering the designated primary location from the immediate preceding secondary location is transitioned from an inactive state to an active state. Similarly, each open window that exits the primary location and enters the immediate succeeding secondary location is transitioned from the active state back into the inactive state. In some implementations, the user's browsing input can also dictate the speed by which the browsable parade advances through the series of locations across the three-dimensional desktop. For example, a more exaggerated or faster swiping gesture on a touch-sensitive surface can indicate a faster advancing speed.

Figure 1B:
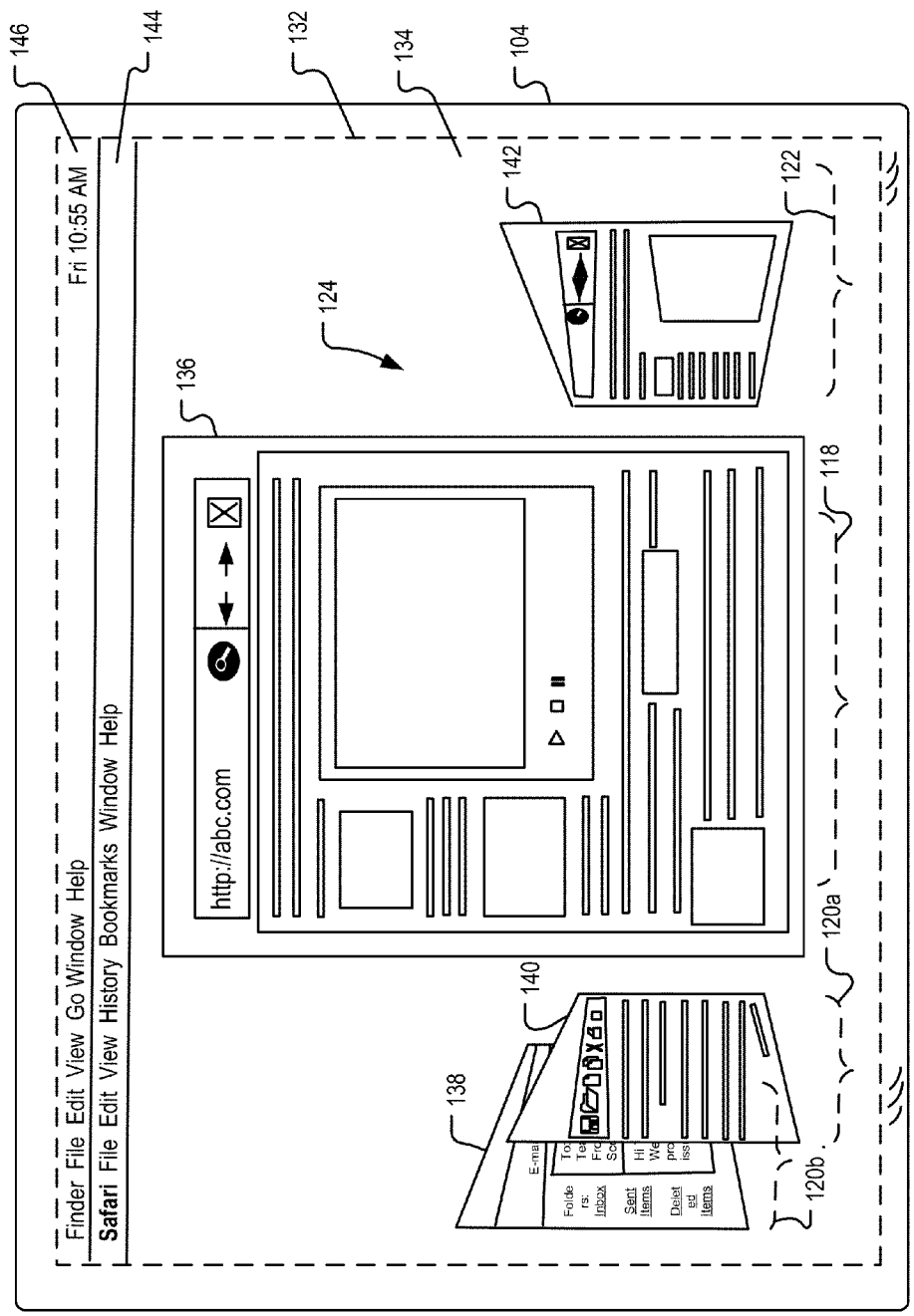
FIG. 1B illustrates an exemplary three-dimensional desktop showing a three-dimensional browsable parade of open windows.

FIG. 1B illustrates an exemplary three-dimensional desktop 132 in which open windows are presented in a three-dimensional browsable parade 124.

As shown in FIG. 1B, the three-dimensional desktop 132 includes a three-dimensional desktop space 134, instead of a two-dimensional desktop plane 102. The three dimensional browsable parade 124 includes graphical objects, each graphical object (e.g., windows 136, 138, 140, and 142) representing a corresponding open window existing in the desktop environment. Although the graphical objects representing the open windows are still essentially flat (e.g., having a small thickness relative to width and height of the window), spatial placement and movement of the window graphic objects are no longer restricted in a two-dimensional desktop plane substantially coplanar or parallel to the surface of the display screen 104.

For example, as shown in FIG. 1B, the three-dimensional desktop space 134 can include a common ground plane on which each open window can stand. The common ground plane can extend horizontally across and into the three-dimensional desktop space 134. The common ground plane can provide a common baseline for neatly organizing the open windows in the three-dimensional space 134. The series of locations (e.g., primary location 118, and secondary locations 120a-b and 122) that the browsable parade of open windows advances through can be a curved path coming toward the front of the screen from the left, and after passing the center of the screen, the curved path can recede toward the back of the screen to the right.

In some implementations, the open windows do not necessarily stand on the same ground plane, and do not necessarily follow the curved path as described above. Other configurations of the ground plane and/or path for the browsable parade 124 are possible. For example, a zigzagged or slightly hilly ground plane or a straight or serpentine path for the browsable parade can also be implemented.

In some implementations, the open windows shown in the secondary locations 120a-b on the left side of the desktop 132 can be rotated by an angle about a respective axis normal to the ground plane, such that each open window becomes partially obscured by an immediate preceding window. For example, window 140 precedes window 138 in the three-dimensional browsable parade 124, and the window 138 is partially obscured by the window 140.

Similarly, the open windows in the secondary locations 122 are also rotated by an angle about a respective axis normal to the ground plane. Each open window can become partially obscured by an immediate succeeding window. However, in this example, since only one open window exists on the right side of the desktop, no obscuration is occurring. By rotating the windows in the secondary locations, more windows can be displayed in within the limited space occupied by the secondary locations in the three-dimensional desktop space 134.

In some implementations, the spacing between adjacent windows in the secondary locations can be enlarged or shrunken to adjust the amount of obscuration that is occurring between the adjacent windows. For example, when the spacing between adjacent secondary locations is increased, the amount of obscuration by an adjacent window can be decreased. In some implementations, the spacing is automatically adjusted depending on the number of open windows that are displayed on the desktop.

In some implementations, the number of secondary locations available in the three-dimensional desktop can be changed according to the number of open windows existing on the desktop. For example, when a number 2N of open windows exists on the desktop, N secondary locations can be created on one side of the primary location, and N−1 secondary locations can be created on the other side of the primary location. Similarly, when a number 2N+1 of open windows exists on the desktop, N secondary locations can be created on each side of the primary location.

When the total number of locations (primary location and secondary locations) is equal to the number of open windows on the desktop, all open windows can be simultaneously visible on the desktop. In some implementations, as the browsable parade of open windows progresses through the series of locations on the desktop, the open window exiting the last secondary location on one side of the desktop can be inserted into the first secondary location on the other side the desktop. For example, if the user browses from left to right, when the window 142 exits the secondary location 122, it can be inserted into the secondary location 122b, while all of the other windows (e.g., windows 138, 140, and 136) move to the right by one location.

In some implementations, the total number of primary and secondary locations for displaying the open windows can be fewer than the number of open windows on the desktop. If the number of locations for displaying the open windows is fewer than the number of open windows on the desktop, only a partial set of all the open windows can be visible on the desktop at a time. As the browsable parade advances through the series of locations, only a segment of fixed length in the browsable parade is visible in the desktop at a time.

In some implementations, the open window entering the primary location is presented in an enlarged and frontal view. For example, the open window in the primary location (e.g., window 136) can have a height occupying 70% of the screen height. In some implementations, the user is allowed to specify a preferred window size for the open window occupying the designated primary location (e.g., primary location 118). The enlarged size of the open window in the primary location can allow the user to view the content and user interface elements of the open window with ease, so that the user can interact with the open window without strain.

In some implementations, the sizes of the windows (e.g., windows 138, 140, and 142) presented in the secondary locations (e.g., secondary locations 120a-b and 122) can be significantly shrunken from their original sizes, such that the windows can fit within the limited space occupied by the secondary locations. However, the appearance of the windows in the secondary location need not be altered significantly otherwise, so users can still easily recognize the shrunken windows.

In some implementations, if an extended screen is available, the sizes of the windows presented in the secondary locations need not be significantly shrunken from their original sizes. The open windows in the secondary locations can simply be rotated by an angle such that all the open windows in the browsable parade can fit within the display space.

In some implementations, the sizes of the windows in the secondary locations can be scaled such that the relative sizes of the windows remain constant. By maintaining the relative sizes of the windows, this provides an additional visual cue to users to recognize an open window from the browsable parade.

In some implementations, when transitioning from the two-dimensional desktop (e.g., the desktop 100 shown in FIG. 1A) to the three-dimensional desktop in the cover-flow view (e.g., the desktop 132 shown in FIG. 1B), the representations of the open windows in the two-dimensional desktop and the three-dimensional desktop can be interpolated, such that animations showing a smooth transition between the two-dimensional desktop to the three-dimensional desktop can be presented. The current active window (e.g., the window 106) in the two-dimensional desktop space can be transformed into the current active window (e.g., the window 136) displayed at the designated primary location of the three-dimensional desktop. The other open windows (e.g., the windows 108, 110, and 112) in the two-dimensional desktop can be distributed into the secondary locations on either side of the designated primary location.

In some implementations, when transitioning between the two-dimensional desktop and the three-dimensional desktop, the order of the open windows in the browsable parade 124 can be based the relative display priority of the open windows in the display stack of the two-dimensional desktop. For example, the open window having the highest display priority in the display stack can be placed in the designated primary location of the three-dimensional desktop upon completion of the transition. The rest of the open windows can be organized into the cyclic browsable parade starting from the position immediately succeeding the top window to the position immediately preceding the active window. As a result, as the browsable parade advances through the primary location, each window in the browsable parade can enter the primary location in the order according to its display priority in the display stack.

In some implementations, the user can invoke another input command to return to the two-dimensional desktop from the three-dimensional cover-flow view. When the user returns to the two-dimensional desktop, the reverse animation sequence can be performed to convert the three-dimensional desktop space back into the two-dimensional desktop plane. Each window can be displayed at a corresponding location on the two-dimensional desktop plane, e.g., at their original locations. The windows can be rendered according to their updated display priority in the display stack. In some implementations, if the user has interacted with some or all windows while in the three-dimensional cover-flow view, the number and/or order of the open windows in the display stack may have been altered. The windows can be displayed according to the updated display stack when rendering the two-dimensional desktop.

In some implementations, as shown in FIG. 1B, the open window in the designated primary location 118 becomes the current active window of the desktop. The user may begin interacting with the content of the current active window using the user interface elements provided by the application of the current active window without leaving the three-dimensional cover flow view. For example, the user may scroll the content of the webpage in the window 136, click on links in the webpage, play a video in the embedded video player, and so on, in the window 136.

In addition to the enlarged view of the open window displayed at the primary location 118, an application menu bar 144 of the current active window (e.g., the browser window 136) can be presented at a designated location in the three-dimensional desktop 134 (e.g., near the top of the display screen 104). In some implementations, the application menu bar 144 can be displayed under a desktop root menu bar 146, for example. In some implementations, other designated locations on the desktop plane 102 can be used to present the application menu bar, as well. The application menu bar 144 can provide a more comprehensive set of commands and options in various cascading menus that are displayed when the user selects an item listed in the application menu bar.

For example, the application menu bar 144 of the current active window is an application menu bar of a web browser application. The user may use the application menu bar 144 to locate previously visited webpages, go to a bookmarked webpage, to view the source code of the webpage, to view other open windows of the web browser application, and so on, by selecting the appropriate menu items in the application menu bar 144.

Sometimes the application menu bar 144 can include options and/or commands that cause additional windows to be opened in the three-dimensional desktop space. Sometimes, the current active window in the primary location itself can include elements that can cause new application windows to be generated when invoked. Sometimes, the user can launch a new application, such that a new application window can be opened in the desktop.

In some implementations, if a new window is opened, the newly opened application window can obtain input focus and become the current active window of the desktop. The newly opened application window can be inserted into the primary location of the desktop, replacing the previous active window. The previous active window can be moved forward into the secondary location immediately succeeding the primary location. In some implementations, a new secondary location can be created next to the primary location to accommodate the previous active window.

In some implementations, if the new active window is provided by the same application as the application providing the previous active window, the application menu bar presented at the designated menu location on the desktop space does not need to be altered. However, if the user opens a new window (e.g., by launching a new application, opening a new file system folder, invokes a new desktop control interface, etc.) and the new window is provided by a different application from the application providing the previous active window, then the application menu bar 144 displayed in the desktop space 134 can be replaced by the application menu bar of the new active window.

Figure 1C:
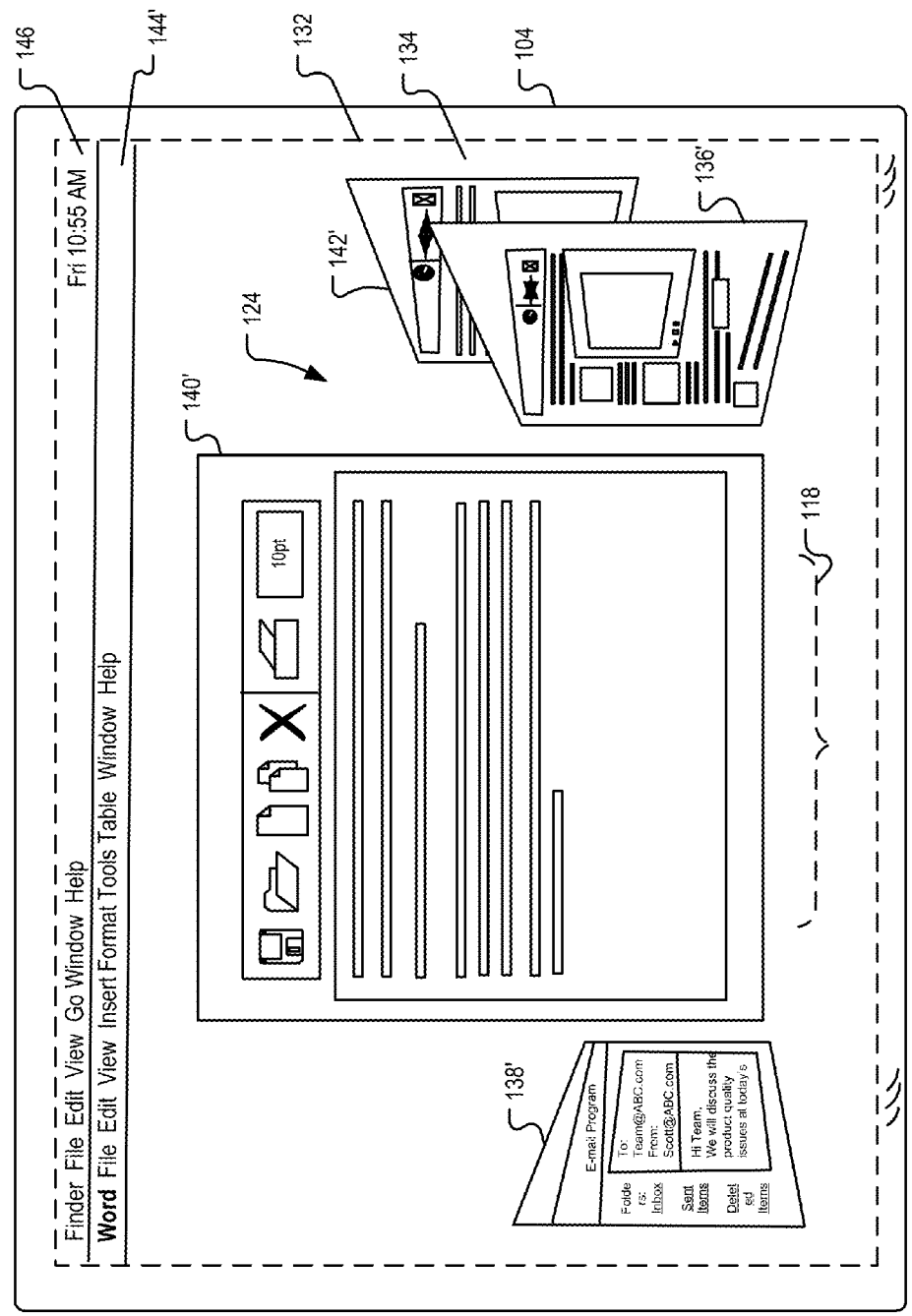
FIG. 1C illustrates an exemplary diagram illustrating the progression of the browsable parade through a designated primary location in the three-dimensional desktop.

In some implementations, if the user does not open a new window, but simply browses the browsable parade in either direction (e.g., left-to-right, right-to-left, clockwise, or counter-clockwise), as an existing window (e.g., the window 140) in the browsable parade 124 enters the primary location 118 of the desktop, the existing window (e.g., the window 140) can become the new active window of the desktop (e.g., as shown in FIG. 1C). If the application providing the new active window differs from the application providing the previous active window, the application menu bar 144 can be updated to show the application menu bar of the new active window.

In some implementations, instead of browsing through the open windows in the browsable parade 124 one by one in a user-specified direction, the user can directly select an existing open window shown in a secondary location of the desktop. Upon the user's selection, the selected window can be inserted into the designated primary location of the browsable parade 124, replacing the previous active window in the primary location 118. The selected window can become the new active window of the desktop. The application menu bar 144 can be updated to show the application menu bar provided by the application of the new active window.

In some implementation, when the selected open window is inserted into the primary location of the desktop and becomes the new active window of the desktop, the previous active window can be inserted into the secondary location previously occupied by the selected open window. An animation sequence can be shown to show the switching of places between the two windows.

In some implementations, when the selected open window is inserted into the primary location and becomes the new active window of the desktop, a segment of the browsable parade 124 from the previous active window to the window immediately succeeding the selected window can be advanced by one location to fill the secondary location left vacant by the selected window. In such implementations, the relative display priority of the open windows can be consistently maintained according to the time that the open windows were last accessed. Therefore, when the user switches back to the two-dimensional desktop, the open windows can be rendered on the two-dimensional desktop plane according to their respective display priorities.

In some implementations, the application menu bar 144 displayed at the designated menu location of the three-dimensional desktop space 134 can indicate the title or logo of the application that provided the current active window. By indicating the title or logo of the application providing the current active window, the user can be provided an additional visual cue for identifying the application program providing the current active window. This visual cue help the user distinguish applications that have similar top-level menu items and layouts. This visual cue also helps to indicate the changes in the application menu bar.

In some implementations, visual effects showing the transition from a secondary location into the primary location, and from the primary location back to the secondary location can be implemented. The visual effects can mimic the appearance of windows being paraded in front of an audience. For example, when the user browses the browsable parade in a direction from the left to the right of the desktop space 134, the open windows (e.g., the windows 138 and 140) displayed in the secondary locations (e.g., secondary locations 120*a-b*) on the left side of the display can be turned at an angle to face toward the primary location 118 in the central region of the desktop space 134. Similarly, the open windows (e.g., the window 142) displayed in the secondary locations (e.g., secondary location 122) on the right side of the display can be turned at an opposite angle to face toward the primary location 118 in the central region of the desktop as well.

When the user browses from left to right, each open window other than the rightmost window can move toward the right of the screen by one location at a time. For example, the window 138 can advance to the location of the window 140, and window 140 can in turn advance toward the primary location 118. When the window 140 reaches the primary location 118, the window 140 can rotate to face the front of the display, and become enlarged. The previous window (e.g., the window 136) occupying the primary location 118 can advance into the secondary location 122. As the previous active window (e.g., the window 136) reaches the secondary location on the right, the previous active window can be rotated to face toward the primary location 118. The previous active window can also be shrunken in size to match the size of the other windows in the secondary locations. The rightmost window (e.g., the window 122) can be inserted into the first secondary location (e.g., secondary location 120*b*) on the left, once it has been vacated by the window (e.g., window 138) previously occupying the first secondary location.

FIG. 1C illustrates an exemplary configuration that would result from the above browsing. For example, the new active window 140' at the primary location 118 corresponds to the window 140. The window 136' corresponds the previous active window 136. The window 142' corresponds to the window 142, and the window 138' corresponds to the window 138.

As shown in FIG. 1C, the three-dimensional desktop 132 now shows a different open window (e.g., window 140') occupying the designated primary location 118 (e.g., as a result of browsing or selecting from the browsable parade 124) from the open window (e.g., the window 136) shown in FIG. 1B. In FIG. 1C, the open window (e.g., the window 140') occupying the primary location 118 belongs to an application other than the application providing the previous active window (e.g., window 136 of FIG. 1B). Therefore, the application menu bar 144' displayed at the designated menu location of the three-dimensional desktop 132 has been updated to show the application menu bar of the new active window.

The user can start interacting with the open window in the primary location 118 shown in FIG. 1C using the user interface elements provided in the open window 140', and the application menu bar 144' presented at the designated menu location of the desktop. The open window 140' in conjunction with the application menu bar 144' can provide the full-range of interaction capabilities that are conventionally available to the user in the application environment of the window 140'. For example, if the open window in the primary location is a window of a word processing application. The user may start entering text, altering the format of the text, opening a new document, performing a spell check, and so on using the user interface elements of the window 140' and the menu items of the application menu bar 144'.

In some implementations, instead of organizing the open windows in the browsable parade according to their relative display priority in a display stack, the open windows can be clustered into groups. For example, application windows provided by the same application can be grouped together and presented in a common cluster within the browsable parade 124. In some implementations, each open window in the same cluster can occupy its own position in the browsable parade 124 and can enter the primary location one at a time as the user browses through the browsable parade 124.

In some implementations, the open windows in the same cluster can be placed in the same location and advances through the series of locations (e.g., primary location 118 and secondary locations 120*a-b*, and 122) as a unit.

Figure 1D:
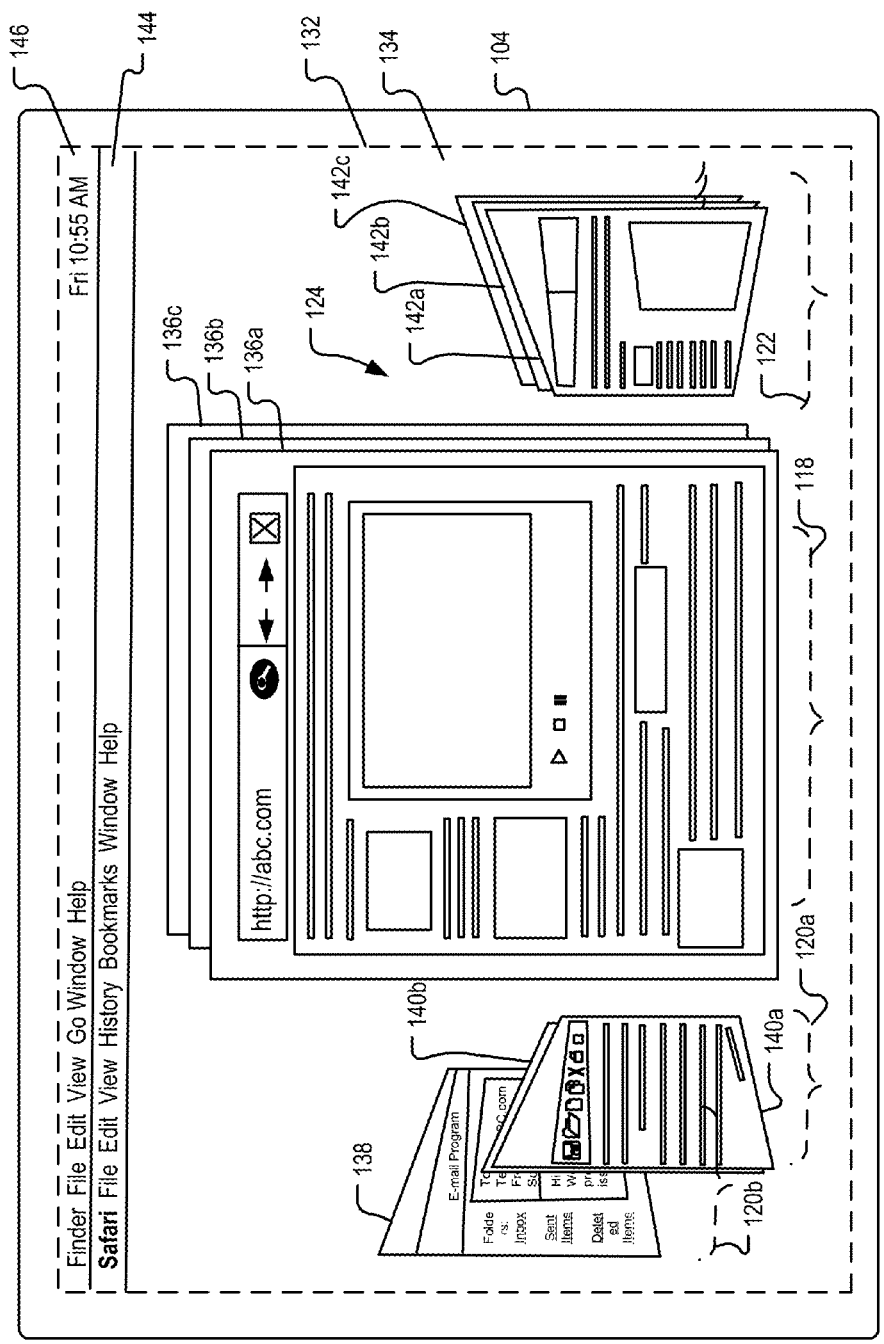
FIG. 1D illustrates an exemplary three-dimensional desktop showing another three-dimensional browsable parade of open windows.

For example, as shown in FIG. 1D, the browsable parade 124 include clusters of open windows (e.g., cluster 136*a-c*, cluster 142*a-c*, cluster 140*a-b*, and cluster 138) that belong to different applications. In each of the series of locations (e.g., the primary location 118 and the secondary locations 120*a-b* and 122) of the three-dimensional desktop 132, one or more open windows provided by the same application can be displayed. For example, in the primary location 118, three open windows (e.g., the windows 136*a-c*) belonging to the web browser application are presented. In the secondary location 120*a* immediately preceding the primary location 118, two open windows (e.g., the windows 140*a* and 140*b*) belonging to the word processing application can be presented. In the secondary location 122 immediately following the primary location 118, three open windows (e.g., the windows 142*a*-142*c*) belonging to a Portable Document Format (PDF) reader can be presented. In the secondary location 120*b*, a window (e.g., window 138) for an email program can be presented.

When the open windows in the same cluster are placed in the same location in the browsable parade, each cluster can advance through the series of locations (e.g., primary location 118 and secondary locations 120*a-b*, and 122) in the desktop as a unit. For example, when the user browses from the right of the screen to the left, the entire group of web browser windows (e.g., the windows 136*a-c*) can exit the primary location 118 and enter the secondary location 120*a* on the left of the primary location 118. In turn, the entire group of word processing windows (e.g., the windows 140*a-b*) can be moved to the next secondary location on the left (e.g., secondary location 120*b*). At the same time, the Portable Document Format (PDF) reader windows (e.g., the windows 142*a-c*) can be moved into the primary location 118. Since each cluster of open windows belong to a different application, the application menu bar 144 can be updated to show the application of the windows occupying the primary location 118 each time a new cluster of windows enters the primary location 118.

Since more than one open window may exist in each application cluster, when the cluster enters the designated primary location of the three-dimensional desktop space, one of the open windows can be selected to become the current active window of the desktop. For example, the open window having the highest display priority among the windows in the application cluster can be displayed at the front of the application cluster in the primary location, and become the current active window of the desktop.

In some implementations, instead of browsing the different application groups in the browsable parade 124, the user can select a group in a secondary location (e.g., secondary location 122) of the desktop, and the entire selected group of open windows can be inserted into the primary location 118. One of the open windows in the selected group can displayed at the front of the group in the primary location 118, and become the current active window of the desktop. For example, the window having the highest display priority in the group can be displayed at the front of the group, and become the current active window of the desktop.

In some implementations, the user can browse the windows in each group when the group is in the primary location 118. For example, when the group of web browser windows (e.g., the windows 136*a-c*) are in the primary location 118, the user can used a designated input command to cycle through the windows in the group (e.g., by using the up down arrow keys). Each time when a new window in the group becomes the front window in the primary location 118, that window can obtain input focus and become the current active window of the desktop. The user can begin interacting with the active window using the user interface elements and the application menu bar 144 provided by the application of the active window.

By grouping the open windows into application groups, and allowing each group of open windows to advance as a unit in the browsable parade and/or to be selected as a unit to insert into the primary location, the three-dimensional desktop can help the user to first locate the application of interest, and then locate the particular window of interest within the application group. This is helpful when there are a large number of windows open in the desktop that belong to multiple applications, since it would take a long time to browse through individual open windows of applications that the user is not currently interested in. If the user can quickly locate the application that is of interest, the user no longer has to browse through the open windows that belong to applications that are not of interest at the moment.

In addition, since many applications provide a list of open windows in their application menu bars. By selecting the entire group of open windows and placing the group into the primary location 118, the user can use the application menu bar displayed at the designated location in the desktop to review the list of open windows for the application group. The user can then select the desired window through the list of open windows shown in the application menu bar. If a large number of open windows exist in the application group and browsing through the windows one by one can be time-consuming, selecting directly from the window listing in the application menu bar may be more efficient.

Figure 1E:
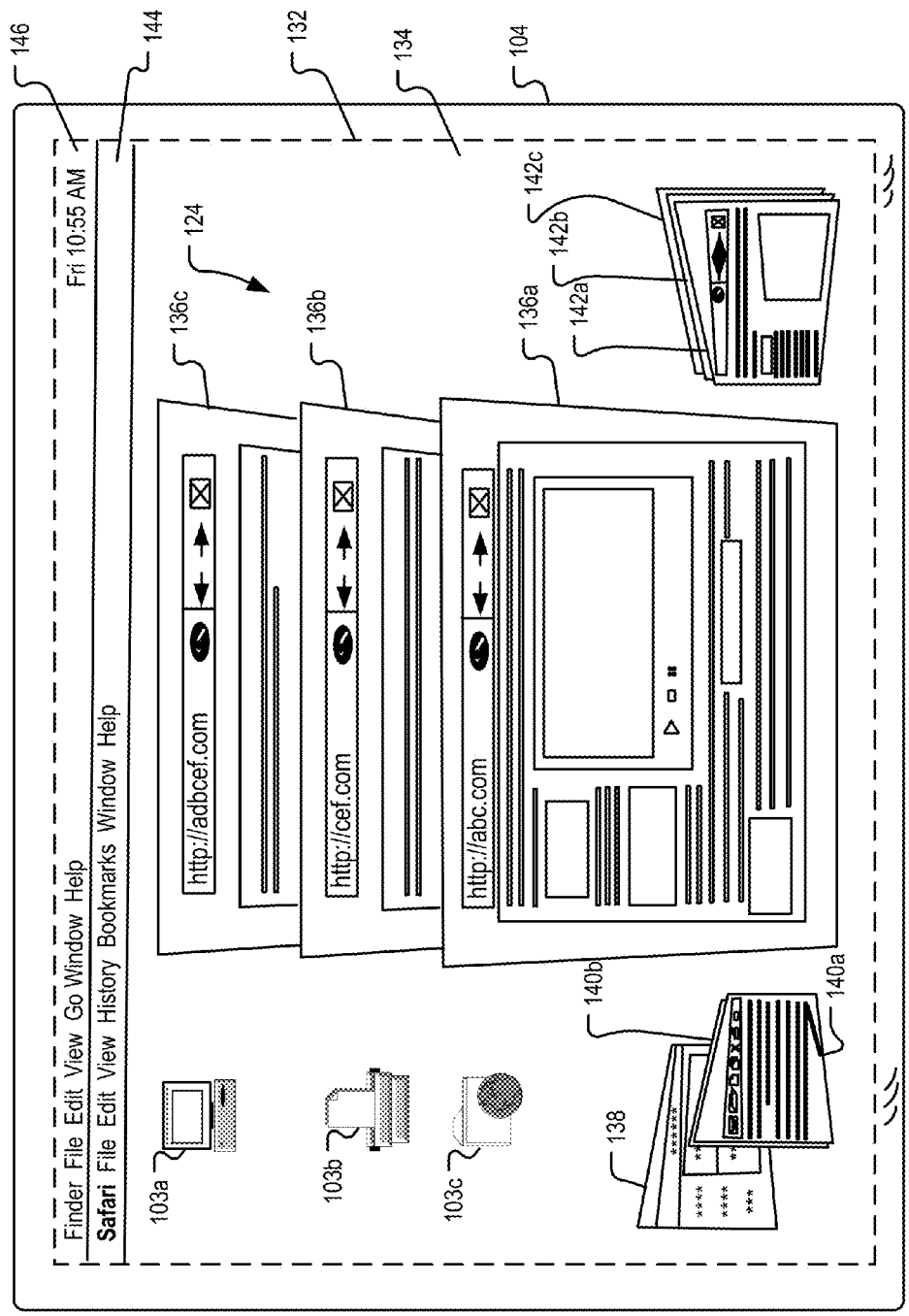
FIG. 1E illustrates an exemplary three-dimensional desktop being tilted at an angle.

In some implementations, the three-dimensional desktop space 134 can be tilted in response to user input. For example, as shown in FIG. 1E, the viewing angle of the three-dimensional desktop space 134 can be raised from the horizontal plane, such that the user can view the group of open windows in the primary location 118 from a higher view point. When viewed from the higher view point, more area of the open windows (e.g., the windows 136b and 136c) behind the front window (e.g., the window 136a) in the application cluster can be revealed. The user can see the content of the open windows and recognize the window of interest from the group of windows.

Once the user has identified the window of interest, the user can selected the window of interest from the group of windows in the primary location 118. Upon selection, the selected window can be moved to the front of the group in the primary location 118, and become the current active window of the desktop. Once the window is selected, the viewing angle can be restored (e.g., to the horizontal plane), such that the selected open window is shown in an enlarged frontal view as shown in FIG. 1D. The user can start working within the front application window without exiting the three-dimensional cover-flow view.

In some implementations, the user can also select a group from the secondary locations while the three-dimensional desktop space is titled (e.g., viewing angle raised from the horizontal plane). The entire selected group of open windows can be moved to the primary location while the three-dimensional desktop space remains tilted. The user can then proceed to view the group of open windows in the primary location from the raised view point, and select the window of interest from the group of windows.

In some implementations, the desktop icons (e.g., desktop icons 103a-c) on the back of the desktop that were previously shielded by the windows in the three-dimensional browsable parade can be revealed when the desktop is tilted. The user can select the desktop icons or other graphical objects displayed on the desktop behind the browsable parade. In some implementations, the user can enter a designated input command to restore the viewing angle of the three-dimensional desktop at any time when the three-dimensional desktop space is in the tilted state.

Exemplary Processes for Presenting and Managing Open Windows

FIGS. 2-8 are exemplary processes for presenting and managing desktops and open windows as described above with respect to FIGS. 1A-1E. The processes can include steps for implementing various aspects of the user interfaces and functionalities described with respect to FIG. 1A-1E. Different combinations and subcombinations of the various aspects are possible.

Figure 2:
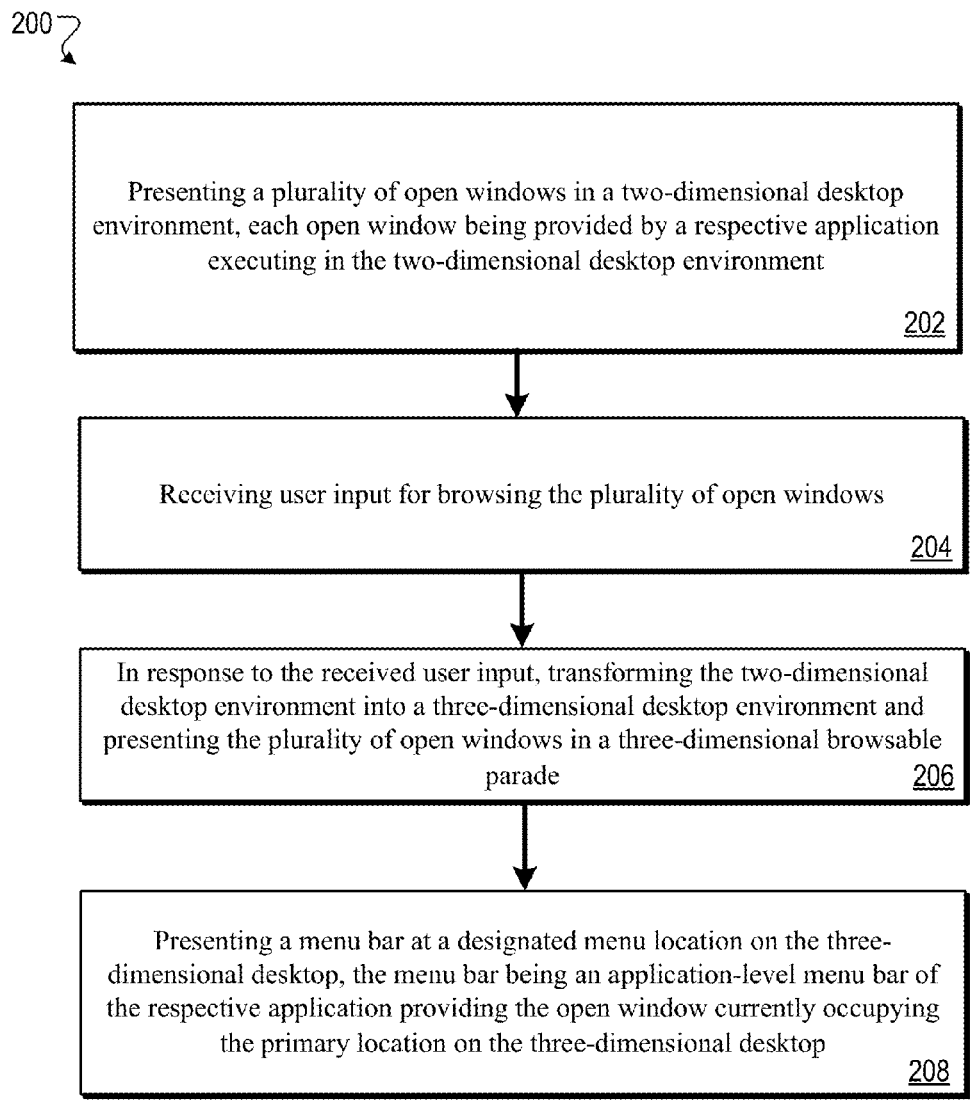
FIG. 2 is flow diagram of an exemplary process for transitioning from a two-dimensional desktop to a three-dimensional desktop.

FIG. 2 is a flow diagram of an exemplary process 200 for transitioning from a two-dimensional desktop to a three-dimensional desktop. First, a plurality of open windows can be presented in a two-dimensional desktop environment, each open window being provided by an application executing in the two-dimensional desktop environment (202). User input for browsing the plurality of open windows can be received while the windows are presented in the two-dimensional desktop environment (204). In response to the received user input, the two-dimensional desktop environment can be transformed into a three-dimensional desktop environment, and the plurality of open windows can be presented in a three-dimensional browsable parade (206). The three-dimensional browsable parade can advance through a series of locations across a three-dimensional desktop under a user's direction. The series of locations include a primary location and one or more secondary locations preceding and succeeding the primary location. Each open window can be presented in an enlarged frontal view when occupying the primary location and in a diminished oblique view when occupying one of the secondary locations. Examples of the enlarged frontal view and the diminished oblique view of the open windows can be seen in FIGS. 1A-1E. In the diminished oblique view, the open windows displayed in the secondary locations are rotated at an angle to face toward the open window displayed at the designated primary location, and shrunken in size relative to their original window sizes and relative to the window shown in the primary location. A menu bar can be presented at a designated menu location on the three-dimensional desktop, where the menu bar is an application-level menu bar of the respective application providing the open window currently occupying the primary location on the three-dimensional desktop (208).

Figure 3:
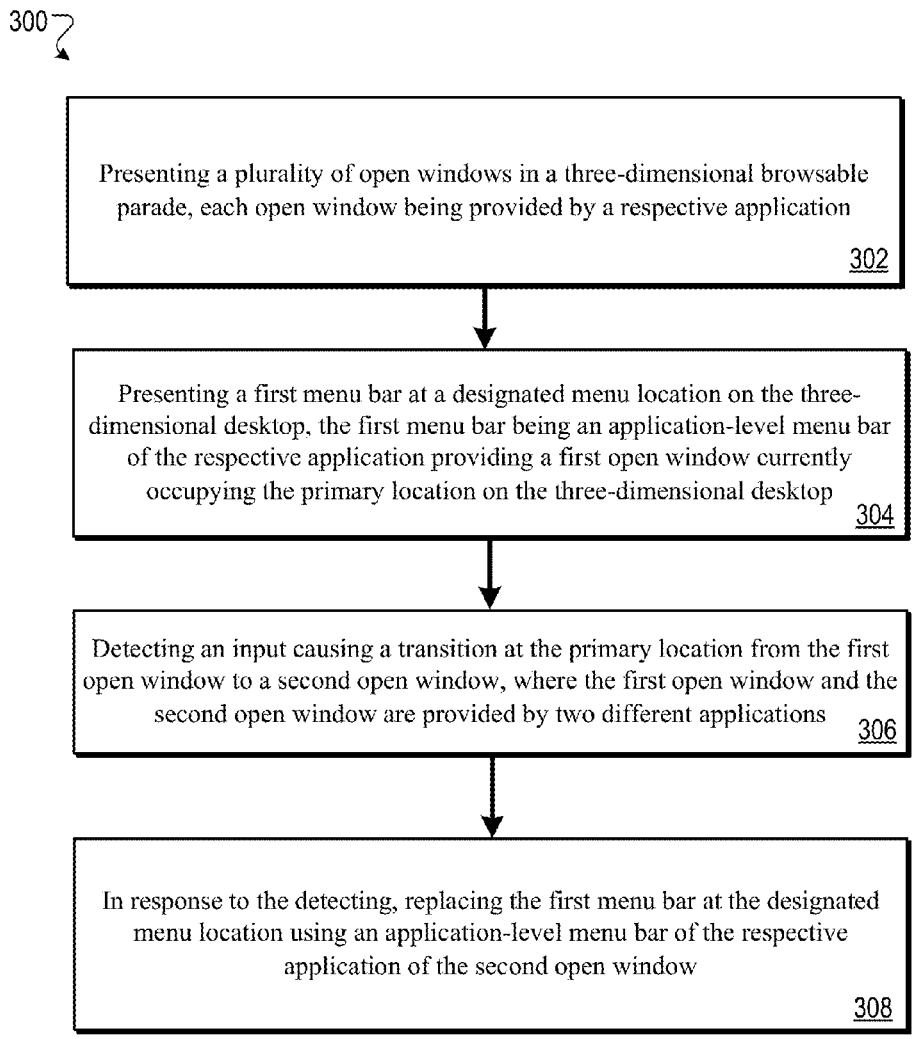
FIG. 3 is a flow diagram of an exemplary process for presenting a three-dimensional browsable parade of open windows in a three-dimensional desktop.

FIG. 3 is a flow diagram of an exemplary process 300 for presenting a three-dimensional browsable parade of open windows in a three-dimensional desktop.

In the process 300, a plurality of open windows can be presented in a three-dimensional browsable parade, where each open window is provided by a respective application (302). The browsable parade can advance through a series of locations across a three-dimensional desktop under a user's direction, the series of locations including a primary location and one or more secondary locations preceding and succeeding the primary location. Each open window can be presented in an enlarged frontal view when occupying the primary location and in a diminished oblique view when occupying one of the secondary locations.

A first menu bar can be presented at a designated menu location on the three-dimensional desktop (304). The first menu bar can be an application-level menu bar of the respective application providing a first open window currently occupying the primary location on the three-dimensional desktop. A browsing input causing a transition at the primary location from the first open window to a second open window can be detected, where the first open window and the second open window are provided by two different applications (306). In response to the detecting, the first menu bar at the designated menu location can be replaced using an application-level menu bar of the respective application of the second open window (308).

In some implementations, the process for presenting the browsable parade and replacing the application menu bar can be performed by a window manager of the operating system. The window manager can communicate with the applications of the open windows, and determine how to produce the graphic objects in the desktop environments. The window manager can enable the interaction capabilities of the open window at the designated primary location on the three-dimensional desktop and the application menu bar displayed at the designated menu location on the three-dimensional desktop. The current occupying window at the designated primary location in conjunction with the application menu bar provides a native operating environment at the primary location of the desktop. Since the window manager is providing the three-dimensional parade and enabling the native operating environment within the three-dimensional parade, the application does not need to be modified to provide such capabilities.

Figure 4A:
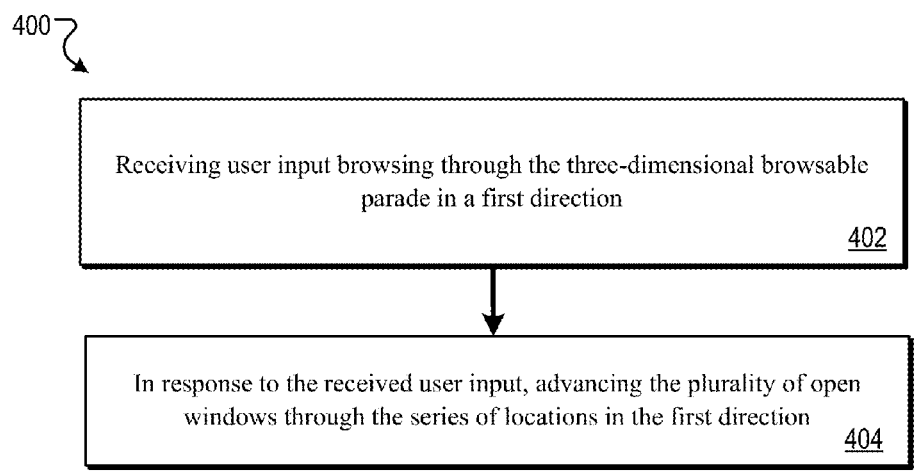
FIG. 4A is a flow diagram of an exemplary process for browsing the three-dimensional parade.

FIG. 4A is a flow diagram of an exemplary process 400 for browsing the three-dimensional parade.

In the process 400, first, user input for browsing through the three-dimensional browsable parade in a first direction can be received (402). In response to the received user input, the plurality of open windows can be advanced through the series of locations in the first direction (404). In some implementations, in order to advance the browsable parade through the series of location, a first window occupying the primary location can be replaced using a second window occupying an immediately preceding secondary location of the primary location in the first direction. A third window occupying an immediately preceding secondary location of the primary location can be replaced using the first window that was replaced from the primary location. Then, the second window can be rendered in the enlarged frontal view and the first window can be rendered in the diminished oblique view.

Figure 4B:
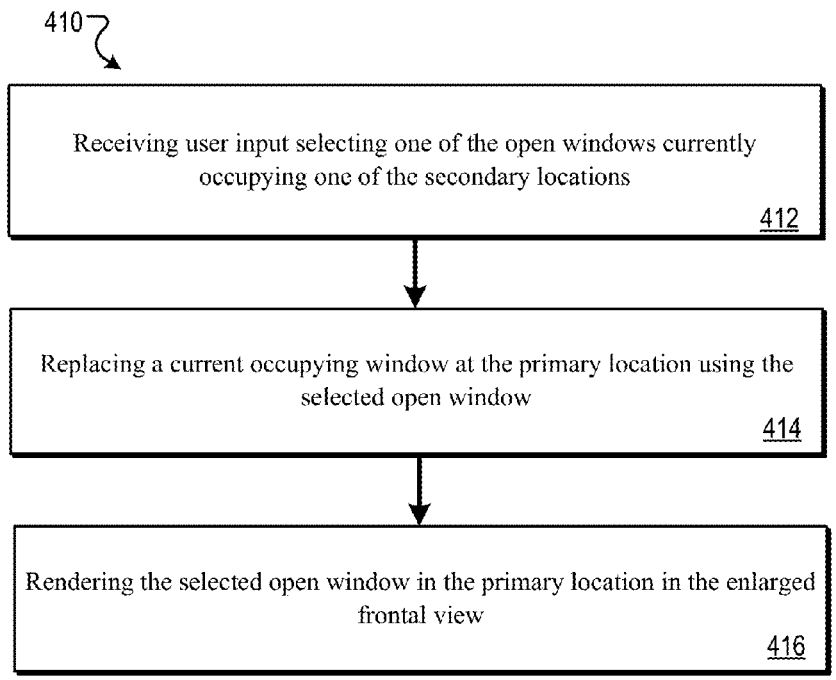
FIG. 4B is a flow diagram of an exemplary process for selecting an open window from the three-dimensional parade.

FIG. 4B is a flow diagram of an exemplary process 410 for selecting an open window from the three-dimensional parade.

In the process 410, user input selecting one of the open windows currently occupying one of the secondary locations can be received (412). Then, a current occupying window at the primary location can be replaced using the selected open window (414). Then, the selected open window can be rendered in the primary location in the enlarged frontal view (416).

Figure 5:
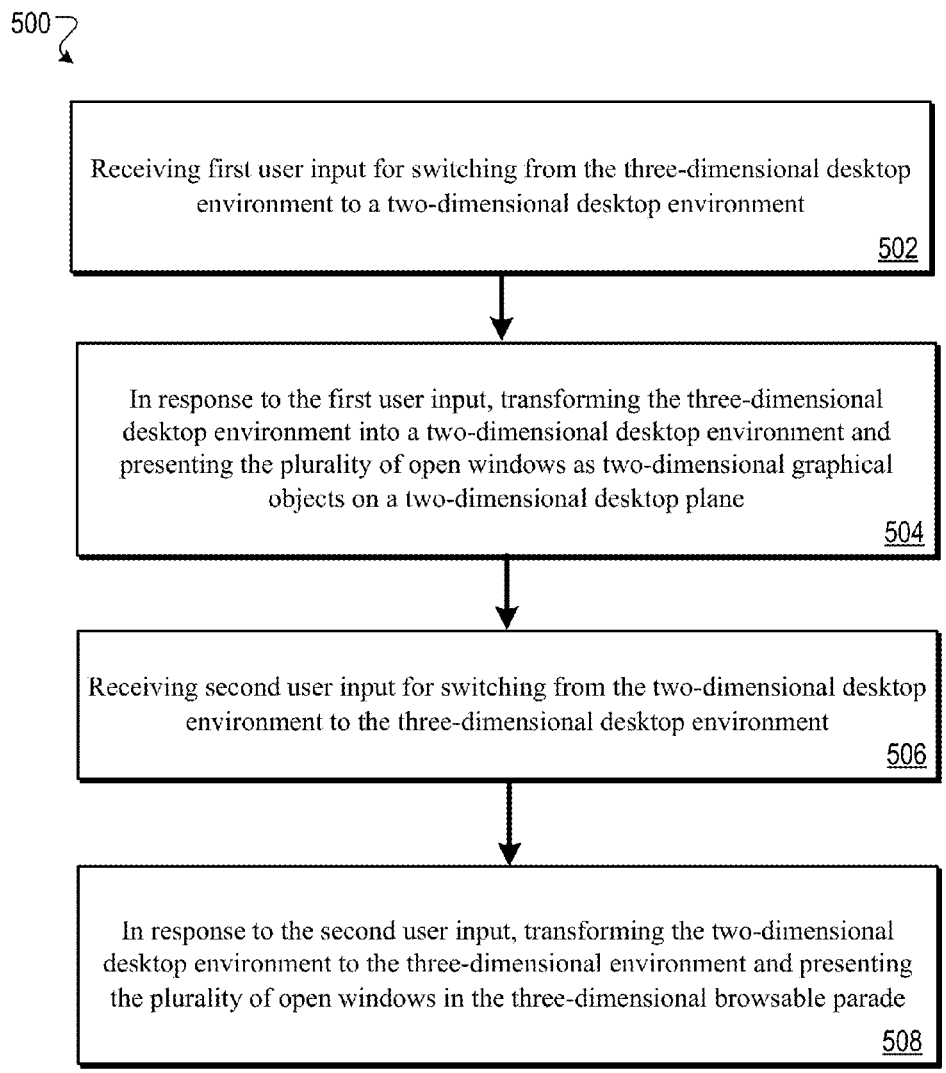
FIG. 5 is a flow diagram of an exemplary process for switching between the two-dimensional desktop and the three-dimensional desktop.

FIG. 5 is a flow diagram of an exemplary process 500 for switching between the two-dimensional desktop and the three-dimensional desktop.

In the process 500, a first user input for switching from the three-dimensional desktop environment to a two-dimensional desktop environment can be received (502). In response to the first user input, the three-dimensional desktop environment can be transformed into a two-dimensional desktop environment and the plurality of open windows can be presented as two-dimensional graphical objects on a two-dimensional desktop plane (504).

To transform back to the three-dimensional desktop environment, a second user input for switching from the two-dimensional desktop environment to the three-dimensional desktop environment can be received (506). In response to the second user input, the two-dimensional desktop environment can be transformed to the three-dimensional environment and the plurality of open windows can be presented in the three-dimensional browsable parade (508).

Figure 6A:
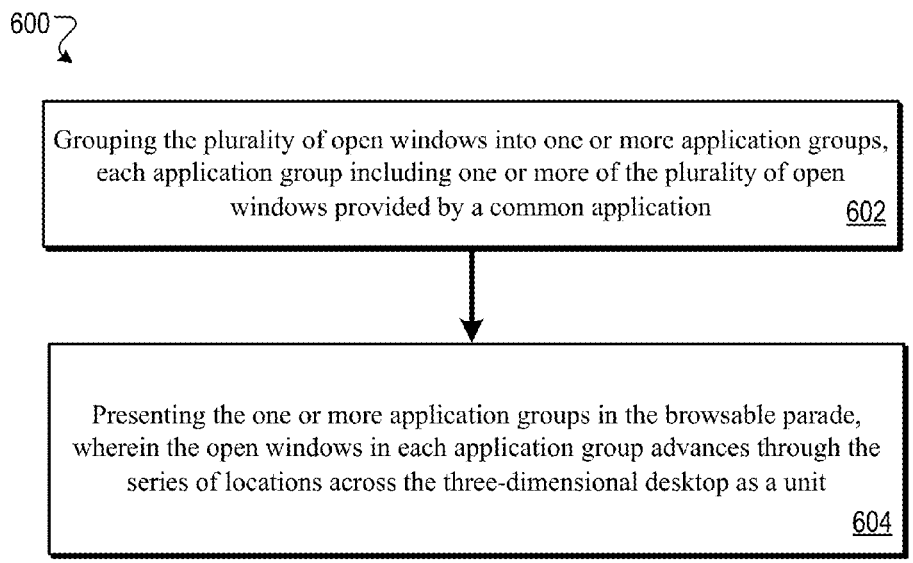
FIG. 6A is a flow diagram of an exemplary process for presenting groups of open windows in the three-dimensional browsable parade.

FIG. 6A is a flow diagram of an exemplary process 600 for presenting groups of open windows in the three-dimensional browsable parade.

In the process 600, first, the plurality of open windows can be grouped into one or more application groups, each application group including one or more of the plurality of open windows provided by a common application (602). Then, the one or more application groups can be presented in the browsable parade, where the open windows in each application group can advance through the series of locations across the three-dimensional desktop as a unit (604).

In some implementations, a first user input for browsing a first application group presented at the primary location can be received. In response to the first user input, the one or more open windows in the application group at the primary location can be cycled through, and one of the one or more windows in the application group can be presented in the enlarged frontal view at a time.

Figure 6B:
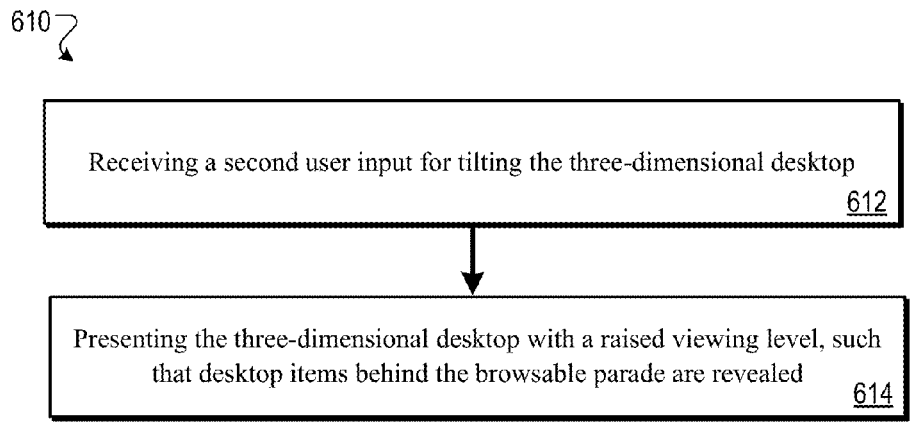
FIG. 6B is a flow diagram of an exemplary process for titling the three-dimensional desktop.

FIG. 6B is a flow diagram of an exemplary process 610 for titling the three-dimensional desktop. In the process 610, a second user input for tilting the three-dimensional desktop can be received (612). In response to the second user input, the three-dimensional desktop can be presented with a raised viewing level, such that desktop items behind the browsable parade can be revealed (614).

Figure 7:
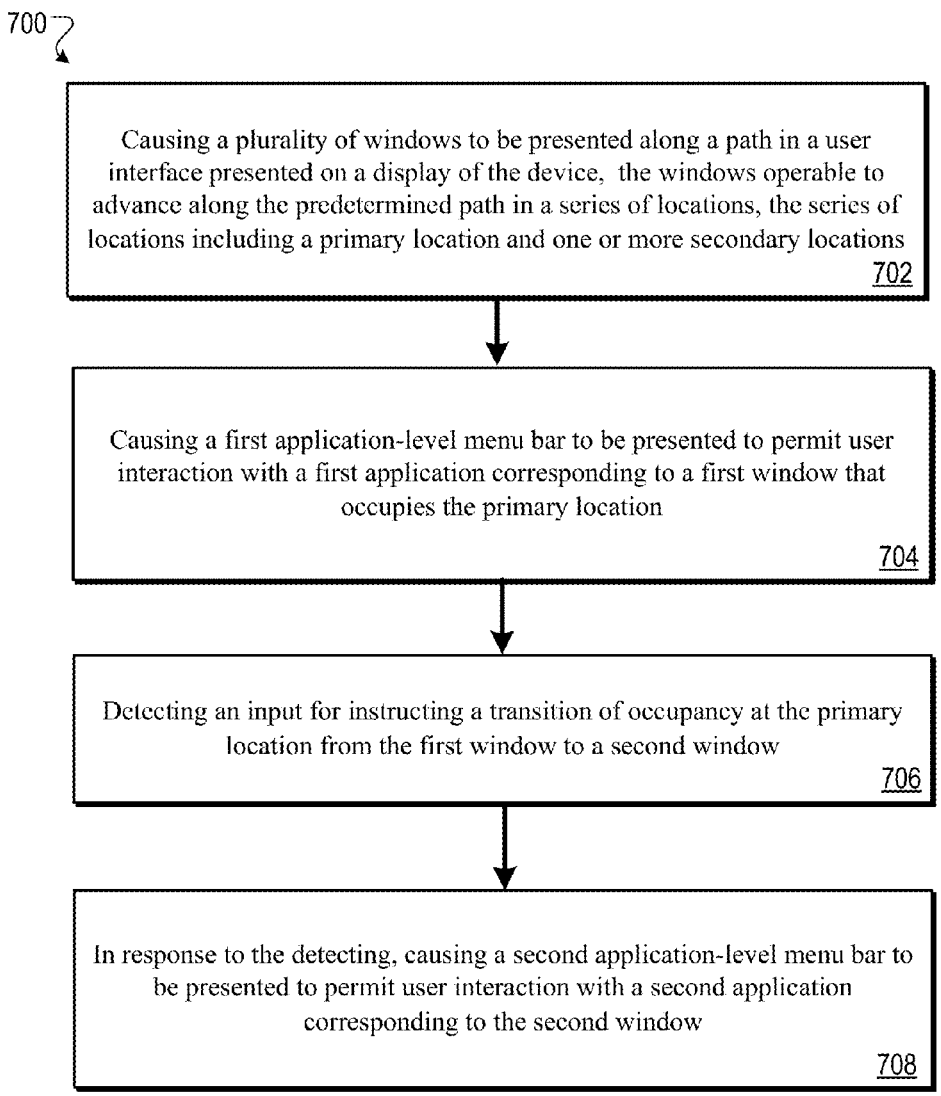
FIG. 7 is a flow diagram of an exemplary process for browsing the open windows along a predetermined path.

FIG. 7 is a flow diagram of an exemplary process 700 for browsing open windows along a predetermined path.

In the example process 700, the operating system can cause a plurality of windows to be presented along a predetermined path in a user interface presented on a display of the device, the windows operable to advance along the predetermined path in a series of locations, the series of locations including a primary location and one or more secondary locations (702). The operating system can cause a first application-level menu bar to be presented to permit user interaction with a first application corresponding to a first window that occupies the primary location (704). The operating system can detect an input for instructing a transition of occupancy at the primary location from the first window to a second window (706). In response to the detecting, the operating system can cause a second application-level menu bar to be presented to permit user interaction with a second application corresponding to the second window (708).

In some implementations, the input instructing the transition of occupancy at the primary location is an input for advancing the windows along the path in a user-specified direction.

In some implementations, the input instructing the transition of occupancy at the primary location is an input selecting the second window while the second window occupies one of the secondary locations.

In some implementations, the plurality of windows are grouped into two or more application groups, each application group including open windows provided by a common application, and the windows in each application group are operable to advance along the path as a unit.

In some implementations, the operating system can detect a second input browsing a first application group occupying the primary location. In response to the second input, the operating system can cause the windows in the first application group to cycle through a first position at the primary location, wherein an window occupying the first position becomes an active window.

In some implementations, the plurality of windows are presented in a three-dimensional (3D) space. The operating system can detect a second input for raising a viewing angle of the 3D space. In response to the second input, the operating system can cause the plurality of windows to be viewed from the raised viewing angle.

FIG. 8 is a flow diagram of another example process 800 for browsing open windows along a predetermined path.

In the example process 800, the operating system can cause a plurality of windows to be presented in a parade (802). Each window is provided by a respective application. The parade is operable to advance along a pre-determined path in a series of locations across a three-dimensional (3D) desktop under a user's direction. The series of locations include a primary location and one or more secondary locations proximate the primary location along the predetermined path. Each open window is presented in an enlarged frontal view when occupying the primary location and in a diminished oblique view when occupying one of the secondary locations. The operating system can present a first application-level menu bar at a designated menu location on the 3D desktop, where the first application-level menu bar permits user interaction with a first application corresponding to a first open window currently occupying the primary location (804). The operating system can detect an input causing a transition of occupancy at the primary location from the first open window to a second open window, where the first open window and the second open window correspond to two different applications (806). In response to the detecting, the operating system can cause a second application-level menu bar to be presented at the designated menu location, the second application-level menu bar permits user interaction with a second application corresponding to the second open window (808).

Other processes implementing one or more aspects of the user interfaces and functionalities described with respect to FIGS. 1A-1E are possible.

Exemplary Computing Devices

Figure 9:
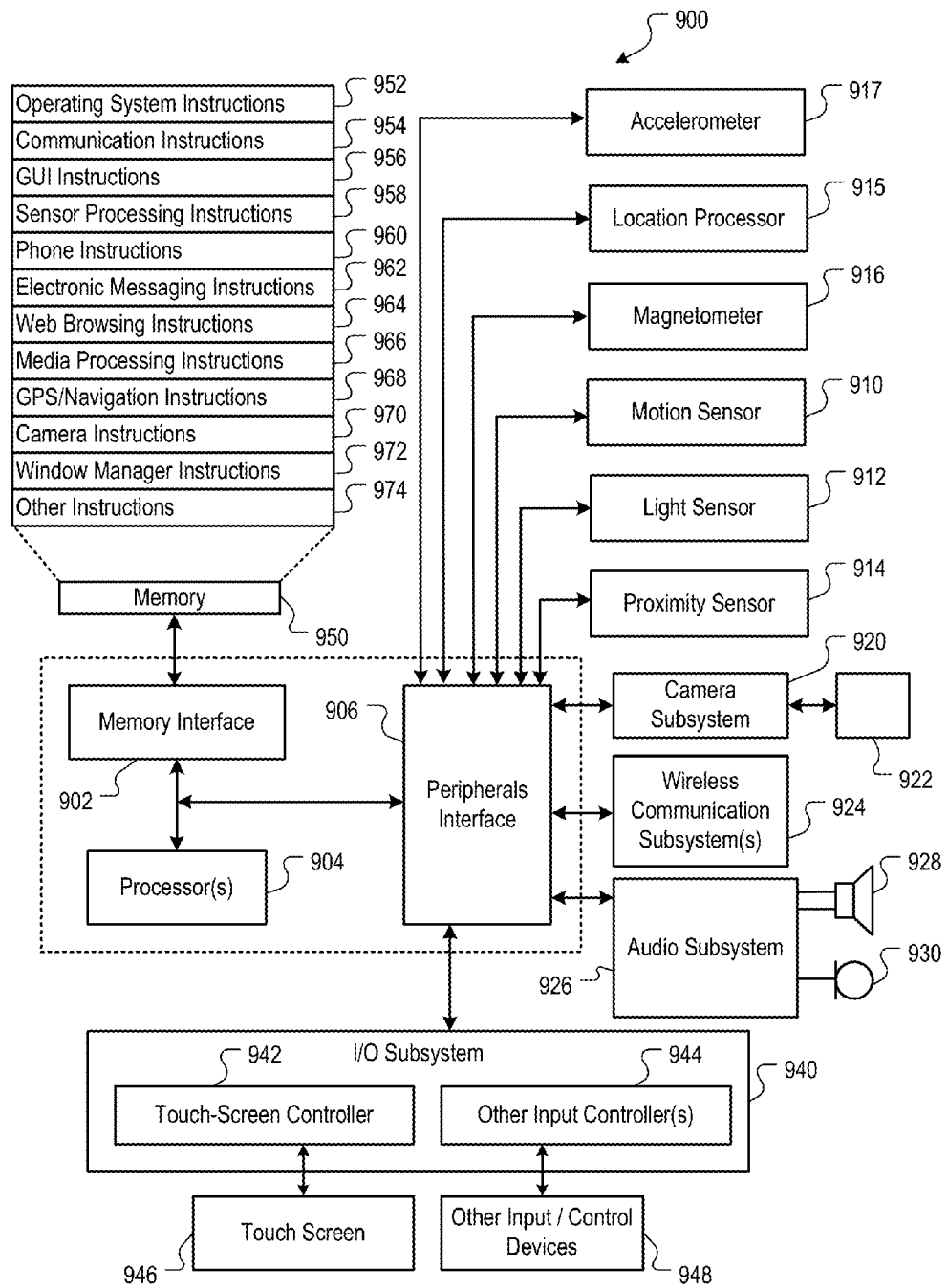
FIG. 9 is a block diagram of an exemplary hardware architecture for implementing the features and processes described in reference to FIGS. 1A-8.

FIG. 9 is a block diagram of an exemplary hardware architecture 900 for implementing the features and processes described in reference to FIGS. 1A-8. Although the architecture shown is for a mobile device (e.g., smart phone, electronic tablet, game device, etc.), the processes and features described in reference to FIGS. 1A-6 can also be implemented by other architectures, including but not limited to: desktop and server computers, game consoles, televisions, etc. For example, all or some of the user interfaces disclosed can be presented by a server computer on a network as web pages. The device can include memory interface 902, one or more data processors, image processors and/or processors 904, and peripherals interface 906. Memory interface 902, one or more processors 904 and/or peripherals interface 906 can be separate components or can be integrated in one or more integrated circuits. The various components in the device, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a WiFi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to the device on or off. The user may be able to customize a functionality of one or more of the buttons. The touch screen 946 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing, such as the user interfaces illustrated in FIGS. 1A-1E; sensor processing instructions 958 to facilitate sensor-related processing and functions; phone instructions 960 to facilitate phone-related processes and functions; electronic messaging instructions 962 to facilitate electronic-messaging related processes and functions, such as SMS and MMS; web browsing instructions 964 to facilitate web browsing-related processes and functions; media processing instructions 966 to facilitate media processing-related processes and functions; GPS/Navigation instructions 968 to facilitate GPS and navigation-related processes and instructions; and camera instructions 970 to facilitate camera-related processes and functions. The memory 950 may also store other software instructions (not shown), such as security instructions, web video instructions to facilitate web video-related processes and functions, and/or web shopping instructions to facilitate web shopping-related processes and functions.

Memory 950 can include window manager instructions 972 for implementing a window manager for further implementing the features, user interfaces, and processes described in reference to FIGS. 1A-8. The window manager 972 can interact with or be part of the graphical user interface instructions 956. Memory 950 can also include other instructions 974 for implementing other functionalities.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method performed by one or more processors of a device, comprising:
presenting a plurality of windows along a path in a first region in a user interface presented on a display of the device, the windows operable to advance along a predetermined path in a series of locations, the series of locations including a primary location and one or more secondary locations;
identifying a first window corresponding to a first application that occupies the primary location;
presenting a first application-level menu bar in a second region that is separate from the first region in the user interface, the first application-level menu bar to permit user interaction with the first application corresponding to the first window that occupies the primary location;

detecting an input for instructing a transition of occupancy at the primary location from the first window to a second window that corresponds to a second location; and in response to the detecting— in the first region, presenting the second window that corresponds to the second application at the primary location instead of the first window that corresponds to the first application; and in the second region, presenting a second application-level menu bar instead of the first application-level menu bar, the second application-level menu bar to permit user interaction with a second application corresponding to the second window.

2. The method of claim 1, wherein the input instructing the transition of occupancy at the primary location is an input for advancing the windows along the path in a user-specified direction.

3. The method of claim 1, wherein the input instructing the transition of occupancy at the primary location is an input selecting the second window while the second window occupies one of the secondary locations.

4. The method of claim 1, wherein the plurality of windows are grouped into two or more application groups, each application group including open windows provided by a common application, and the windows in each application group are operable to advance along the path as a unit.

5. The method of claim 4, further comprising:

detecting a second input browsing a first application group occupying the primary location; and in response to the second input, causing the windows in the first application group to cycle through a first position at the primary location, wherein a window occupying the first position becomes an active window.

6. The method of claim 4, wherein the plurality of windows are presented in a three-dimensional (3D) space, and the method further comprises:

detecting a second input for raising a viewing angle of the 3D space; and in response to the second input, causing the plurality of windows to be viewed from the raised viewing angle.

7. A computer-implemented method performed by one or more processors of a device, comprising:

presenting a plurality of windows in a parade, each window being provided by a respective application, the parade operable to advance along a pre-determined path in a series of locations across a three-dimensional (3D) desktop under a user's direction, the series of locations including a primary location and one or more secondary locations proximate the primary location along the pre-determined path, and each open window being presented in an enlarged frontal view when occupying the primary location and in a diminished oblique view when occupying one of the secondary locations;

identifying a first open window corresponding to a first application that occupies the primary location;

presenting a first application-level menu bar at a designated menu location that is separate from the series of locations on the 3D desktop, the first application-level menu bar permits user interaction with a first application corresponding to the first open window currently occupying the primary location;

detecting an input causing a transition of occupancy at the primary location from the first open window to a second open window, where the second open window corresponds to a second application that is different from the first application; and in response to the detecting— presenting the second open window that corresponds to the second application at the primary location instead of the first open window that corresponds to the first application; and presenting a second application-level menu bar at the designated menu location instead of the first application-level menu bar, the second application-level menu bar permits user interaction with a second application corresponding to the second open window.

8. A non-transitory computer-readable medium having instructions stored thereon, which, when executed by one or more processors, cause the processors to perform operations comprising:

presenting a plurality of windows along a path in a first region in a user interface presented on a display of the device, the windows operable to advance along a predetermined path in a series of locations, the series of locations including a primary location and one or more secondary locations;

identifying a first window corresponding to a first application that occupies the primary location;

presenting a first application-level menu bar in a second region that is separate from the first region in the user interface, the first application-level menu bar to permit user interaction with the first application corresponding to the first window that occupies the primary location;

detecting an input for instructing a transition of occupancy at the primary location from the first window to a second window that corresponds to a second location; and in response to the detecting:

in the first region, presenting the second window that corresponds to the second application at the primary location instead of the first window that corresponds to the first application; and in the second region, presenting a second application-level menu bar instead of the first application-level menu bar, the second application-level menu bar to permit user interaction with a second application corresponding to the second window.

9. The computer-readable medium of claim 8, wherein the input instructing the transition of occupancy at the primary location is an input for advancing the windows along the path in a user-specified direction.

10. The computer-readable medium of claim 8, wherein the input instructing the transition of occupancy at the primary location is an input selecting the second window while the second window occupies one of the secondary locations.

11. The computer-readable medium of claim 8, wherein the plurality of windows are grouped into two or more application groups, each application group including open windows provided by a common application, and the windows in each application group are operable to advance along the path as a unit.

12. The computer-readable medium of claim 11, wherein the operations further comprise:

detecting a second input browsing a first application group occupying the primary location; and in response to the second input, causing the windows in the first application group to cycle through a first position at the primary location, wherein a window occupying the first position becomes an active window.

13. The computer-readable medium of claim 11, wherein the plurality of windows are presented in a three-dimensional (3D) space, and the operations further comprise: detecting a second input for raising a viewing angle of the 3D space; and
in response to the second input, causing the plurality of windows to be viewed from the raised viewing angle.

14. A non-transitory computer-readable medium having instructions stored thereon, which, when executed by one or more processors, cause the processors to perform operations comprising:
presenting a plurality of windows in a parade, each window being provided by a respective application, the parade operable to advance along a pre-determined path in a series of locations across a three-dimensional (3D) desktop under a user's direction, the series of locations including a primary location and one or more secondary locations proximate the primary location along the pre-determined path, and each open window being presented in an enlarged frontal view when occupying the primary location and in a diminished oblique view when occupying one of the secondary locations;
identifying a first open window corresponding to a first application that occupies the primary location;
presenting a first application-level menu bar at a designated menu location that is separate from the series of locations on the 3D desktop, the first application-level menu bar permits user interaction with a first application corresponding to the first open window currently occupying the primary location;
detecting an input causing a transition of occupancy at the primary location from the first open window to a second open window, where the second open window corresponds to a second application that is different from the first application; and
in response to the detecting:
presenting the second open window that corresponds to the second application at the primary location instead of the first open window that corresponds to the first application; and
presenting a second application-level menu bar at the designated menu location instead of the first application-level menu bar, the second application-level menu bar permits user interaction with a second application corresponding to the second open window.

15. A system, comprising:
one or more processors; and
memory coupled to the one or more processors and storing instructions, the instructions, when executed by the one or more processors, cause the one or more processors to perform operations comprising:
presenting a plurality of windows along a path in a first region in a user interface presented on a display of the device, the windows operable to advance along a pre-determined path in a series of locations, the series of locations including a primary location and one or more secondary locations;
identifying a first window corresponding to a first application that occupies the primary location;
presenting a first application-level menu bar in a second region that is separate from the first region in the user interface, the first application-level menu bar to permit user interaction with the first application corresponding to the first window that occupies the primary location;
detecting an input for instructing a transition of occupancy at the primary location from the first window to a second window that corresponds to a second location; and
in response to the detecting:
in the first region, presenting the second window that corresponds to the second application at the primary location instead of the first window that corresponds to the first application; and
in the second region, presenting a second application-level menu bar instead of the first application-level menu bar, the second application-level menu bar to permit user interaction with a second application corresponding to the second window.

16. The system of claim 15, wherein the input instructing the transition of occupancy at the primary location is an input for advancing the windows along the path in a user-specified direction.

17. The system of claim 15, wherein the input instructing the transition of occupancy at the primary location is an input selecting the second window while the second window occupies one of the secondary locations.

18. The system of claim 15, wherein the plurality of windows are grouped into two or more application groups, each application group including open windows provided by a common application, and the windows in each application group are operable to advance along the path as a unit.

19. The system of claim 18, wherein the operations further comprise:
detecting a second input browsing a first application group occupying the primary location; and
in response to the second input, causing the windows in the first application group to cycle through a first position at the primary location, wherein a window occupying the first position becomes an active window.

20. The system of claim 18, wherein the plurality of windows are presented in a three-dimensional (3D) space, and the operations further comprise:
detecting a second input for raising a viewing angle of the 3D space; and
in response to the second input, causing the plurality of windows to be viewed from the raised viewing angle.

21. A system, comprising:
one or more processors; and
memory coupled to the one or more processors and storing instructions, the instructions, when executed by the one or more processors, cause the one or more processors to perform operations comprising:
presenting a plurality of windows in a parade, each window being provided by a respective application, the parade operable to advance along a pre\-determined path in a series of locations across a three-dimensional (3D) desktop under a user's direction, the series of locations including a primary location and one or more secondary locations proximate the primary location along the predetermined path, and each open window being presented in an enlarged frontal view when occupying the primary location and in a diminished oblique view when occupying one of the secondary locations;
identifying a first open window corresponding to a first application that occupies the primary location;
presenting a first application-level menu bar at a designated menu location that is separate from the series of locations on the 3D desktop, the first application-level menu bar permits user interaction with a first application corresponding to the first open window currently occupying the primary location;
detecting an input causing a transition of occupancy at the primary location from the first open window to a second open window, where the second open window corresponds to a second application that is different from the first application; and in response to the detecting:

presenting the second open window that corresponds to the second application at the primary location instead of the first open window that corresponds to the first application; and presenting a second application-level menu bar to be presented at the designated menu location instead of the first application-level menu bar, the second application-level menu bar permits user interaction with a second application corresponding to the second open window.

* * * * *

UNITED STATES PATENT AND TRADEMARK OFFICE
CERTIFICATE OF CORRECTION

PATENT NO. : 8,560,960 B2  
APPLICATION NO. : 12/953389  
DATED : October 15, 2013  
INVENTOR(S) : Thomas Goossens and Fabrice Robinet Page 1 of 1

It is certified that error appears in the above-identified patent and that said Letters Patent is hereby corrected as shown below:

In the Claims:

In Column 27, In Line 6, In Claim 1, delete "detecting-" and insert -- detecting: --, therefor.

In Column 28, In Line 4, In Claim 7, delete "detecting-" and insert -- detecting: --, therefor.

In Column 30, In Line 47, In Claim 21, delete "pre\-determined" and insert -- pre-determined --, therefor.

Signed and Sealed this  
Thirteenth Day of May, 2014

Michelle K. Lee  
*Deputy Director of the United States Patent and Trademark Office*